(12) United States Patent
Hill et al.

(10) Patent No.: US 9,815,032 B2
(45) Date of Patent: Nov. 14, 2017

(54) MIXED MATRIX POLYMER COMPOSITIONS

(71) Applicants: The Regents of the University of Colorado, a Body Corporate, Denver, CO (US); Commonwealth Scientific and Industrial Research Organisation, Campbell (AU)

(72) Inventors: Matthew R. Hill, Pascoe Vale South (AU); Cher Hon Lau, Glen Waverley (AU); Kristina Konstas, Dromana (AU); Phuc Tien Nguyen, Boulder, CO (US); Douglas Gin, Longmont, CO (US); Richard D. Noble, Boulder, CO (US)

(73) Assignees: The Regents of the University of Colorado, Denver, CO (US); Commonwealth Scientific and Industrial Research Organisation, Campbell (AU)

(*) Notice: Subject to any disclaimer, the term of this patent is extended or adjusted under 35 U.S.C. 154(b) by 38 days.

(21) Appl. No.: 14/647,295

(22) PCT Filed: Nov. 26, 2013

(86) PCT No.: PCT/AU2013/001369
§ 371 (c)(1),
(2) Date: May 26, 2015

(87) PCT Pub. No.: WO2014/078914
PCT Pub. Date: May 30, 2014

(65) Prior Publication Data
US 2015/0283520 A1    Oct. 8, 2015

Related U.S. Application Data

(60) Provisional application No. 61/731,409, filed on Nov. 29, 2012, provisional application No. 61/729,758, filed on Nov. 26, 2012.

(51) Int. Cl.
*B01D 53/22* (2006.01)
*B01D 71/70* (2006.01)
(Continued)

(52) U.S. Cl.
CPC .......... *B01D 71/70* (2013.01); *B01D 53/228* (2013.01); *B01D 67/0079* (2013.01);
(Continued)

(58) Field of Classification Search
CPC  B01D 53/228; B01D 67/0079; B01D 69/148; B01D 71/022; B01D 71/024;
(Continued)

(56) References Cited

U.S. PATENT DOCUMENTS

| 4,720,343 A | 1/1988 | Walch et al. |
| 7,125,493 B2 | 10/2006 | Wang et al. |

(Continued)

FOREIGN PATENT DOCUMENTS

| WO | WO 03/026780 A1 | 4/2003 |
| WO | WO 2010/075610 A1 | 7/2010 |

OTHER PUBLICATIONS

Bushell, Alexandra F. et al., "Gas permeation parameters of mixed matrix membranes based on the polymer of intrinsic microporosity PIM-1 and the zeolitic imidazolate framework ZIF-8", Journal of Membrane Science, 427, 2013, pp. 48-62.*

(Continued)

*Primary Examiner* — Jason M Greene
(74) *Attorney, Agent, or Firm* — Wolf, Greenfield & Sacks, P.C.

(57) ABSTRACT

The present invention relates to a mixed-matrix composition comprising polymer having a fractional free volume of at least 0.1 and porous particles.

15 Claims, 9 Drawing Sheets

(51) Int. Cl.
| | |
|---|---|
| *B01D 69/14* | (2006.01) |
| *B01D 71/26* | (2006.01) |
| *C08K 7/22* | (2006.01) |
| *C08K 9/02* | (2006.01) |
| *B01D 71/44* | (2006.01) |
| *B01D 67/00* | (2006.01) |

(52) U.S. Cl.
CPC ........... *B01D 69/148* (2013.01); *B01D 71/26* (2013.01); *B01D 71/44* (2013.01); *C08K 7/22* (2013.01); *C08K 9/02* (2013.01); *B01D 2257/504* (2013.01); *B01D 2257/7025* (2013.01); *Y02C 10/10* (2013.01); *Y02C 20/20* (2013.01)

(58) Field of Classification Search
CPC .... B01D 71/025; B01D 71/027; B01D 71/70; B01D 2257/504; C08K 7/22; C08K 7/24
See application file for complete search history.

(56) References Cited

U.S. PATENT DOCUMENTS

| | | | |
|---|---|---|---|
| 2007/0137477 A1 | 6/2007 | Freeman et al. | |
| 2007/0209505 A1* | 9/2007 | Liu | B01D 53/228 95/45 |
| 2009/0131242 A1* | 5/2009 | Liu | B01D 53/228 502/4 |
| 2009/0149565 A1 | 6/2009 | Liu et al. | |
| 2009/0152755 A1 | 6/2009 | Liu et al. | |
| 2010/0108604 A1* | 5/2010 | Aerts | B01D 61/362 210/640 |
| 2010/0133187 A1 | 6/2010 | Liu et al. | |
| 2010/0249445 A1* | 9/2010 | Yan | H01L 21/3105 556/466 |
| 2011/0297558 A1 | 12/2011 | Hill et al. | |
| 2012/0077019 A1* | 3/2012 | Knoben | B01D 67/0079 428/318.4 |
| 2012/0270731 A1 | 10/2012 | Gaab et al. | |
| 2013/0277300 A1* | 10/2013 | Nunes | B01D 69/02 210/500.25 |

OTHER PUBLICATIONS

Matteucci, Scott et al., "Gas transport in TiO2 nanoparticle-filled poly(1-trimethylsilyl-1-propyne)", Journal of Membrane Science, 307, 2008, pp. 196-217.*
Ben, Teng et al., "Porous aromatic frameworks: Synthesis, structure and functions", CrystEngComm, 15, May 31, 2012, pp. 17-26.*
International Search Report and Written Opinion dated Feb. 12, 2014 in connection with Application No. PCT/AU2013/001369.
International Preliminary Report on Patentability dated Mar. 25, 2015 in connection with Application No. PCT/AU2013/001369.
Bae et al., A high-performance gas-separation membrane containing submicrometer-sized metal-organic framework crystals. Angew Chem Intl Ed. 2010;49:9863-9866.
Baker, Membrane technology and applications, Second Edition. 2004. John Wiley & Sons, Ltd. New York. p. 57, Table 2.2.
Baker, Future directions of membrane gas separation technology. Ind Eng Chem Res. 2002;41(6):1393-1411.
Ben et al., Targeted synthesis of a porous aromatic framework with high stability and exceptionally high surface area. Ang Chem Intl Ed. 2009;48(50):9457-9460.
Ben et al., Gas storage in porous aromatic frameworks (PAFs). Energy & Environ Sci. 2011;4(10):3991-3999.
Ben et al., Targeted synthesis of an electroactive organic framework. J Mater Chem. 2011;21(45):18208-18214.
Ben et al., Porous aromatic frameworks: Synthesis, structure and functions. Cryst Eng Commun. 2013;15(1):17-26. Published on May 31, 2012.

Bushell et al., Gas permeation parameters of mixed matrix membranes based on the polymer of intrinsic microporosity PIM-1 and the zeolitic framework ZIF-8. J Membr Sci. 2013;427:48-62.
Cravillon et al., Controlling zeolitic imidazolate framework nano- and microcrystal formation: insight into crystal growth by time-resolved in situ static light scattering. Chem Mater. 2011;23(8):2130-2141.
Du et al., Advances in high permeability polymeric membrane materials for CO2 separations. Energy & Environ Sci. 2012;5(6):7306-22.
Freeman et al., Structure and properties of glassy polymers. 1998. Tant et al., Eds. ACS Books: Washington D.C., 306-325.
Gao et al., Hyperbranched polymers: from synthesis to applications. Prog Polym Sci. 2004;29(3):183-275.
Gin et al., Polymerized lyotropic liquid crystal assemblies for membrane applications. Macromol Rapid Commun. 2008;29(5):367-389.
Hill et al., The Structure and Properties of Glassy Polymers. Chapter 1, An Overview. American Chemical Society. ACS Symposium Series. Feb. 1999;710:1-20.
Ichiraku et al., An investigation of the high gas permeability of poly (1-Trimethylsilyl-1-Propyne). J Membr Sci. 1987;34(1):5-18.
Konstas et al., Lithiated porous aromatic frameworks with exceptional gas storage capacity. Ang Chem Intl Ed. 2012;51(27):6639-6642.
Koros, Evolving beyond the thermal age of separation processes: Membranes can lead the way. AIChE Journal. 2004;50(10):2326-2334.
Lau et al., Ending aging in super glassy polymer membranes. Angew Chem Intl Ed. 2014;43:5322-5326.
Lu et al., Sulfonate-grafted porous polymer networks for preferential $CO_2$ adsorption at low pressure. J Am Chem Soc. 2011;133(45):18126-18129.
Lu et al., Polyamine-tethered porous polymer networks for carbon dioxide capture from flue gas. Angew Chem Intl Ed. 2012;51(30):7480-4.
Mahajan et al., Mixed matrix membrane materials with glassy polymers, Part 1. Polymr Engin Sci. 2002;42(7):1420-1431.
Mahajan et al., Mixed matrix membrane materials with glassy polymers, Part 2. Polymr Engin Sci. 2002;42(7):1432-1441.
Masuda, Substituted polyacetylenes. J Polym Sci Part A: Polym Chem. 2007;45(2):165-180.
Masuda et al., Poly[1-(trimethylsily1)-1-propyne]: a new high polymer synthesized with transition-metal catalysts and characterized by extremely high gas permeability. J Am Chem Soc. 1983;105(25):7473-7474.
Morisato et al., Synthesis and gas permeation properties of poly(4-methyl-2-pentyne). J Membr Sci. 1996;121(2):243-250.
Nagai et al., Gas permeability and stability of poly(1-trimethylsilyl-1-propyne-co-1-phenyl-1-propyne) membranes. J Polym Sci Part B: Polym Phys. 1995;33(2):289-298.
Noble et al., Separations research needs for the $21^{st}$ century. Ind Eng Chem Res. 2005;44(9):2887-2892.
Peng et al., A covalently-linked microporous organic-inorganic hybrid framework containing polyhedral oligomeric silsesquioxane moieties. Dalton Trans. 2011;40(12):2720-4.
Ramani et al., Influence of poly(ether imide) on the free volume hole size and distributions in poly(ether ether ketone). J Appl Polymr Sci. 2012;125:3200-3210.
Ren et al., Targeted synthesis of a 3D porous aromatic framework for selective sorption of benzene. Chem Commun. 2010;46(2):291-293. Published on Nov. 11, 2009.
Ren et al., Synthesis of a porous aromatic framework for adsorbing organic pollutants application. J Mater Chem. 2011;21(28):10348-10353.
Song et al., Zeolitic imidazolate framework (ZIF-8) based polymer nanocomposite membranes for gas separation. Energy &Environ Sci. 2012;5:8359-8369.
Srinivasan et al., Elucidating the mechanism(s) of gas transport in poly[1-(trimethylsilyl)-1-propyne] (PTMSP) membranes. J Membr Sci. 1994;86(1-2):67-86.

(56) References Cited

OTHER PUBLICATIONS

Titova et al., Stoichiometric synthesis of fullerene compounds with lithium and sodium and analysis of their IR and EPR spectra. Phys Solid State. 2004;46(7):1365-1370.

Wijmans et al., The solution-diffusion model: a review. J Membr Sci. 1995;107(1-2):1-21.

Yuan et al., Targeted synthesis of a porous aromatic framework with a high adsorption capacity for organic molecules. J Mater Chem. 2011;21(35):13498-13502.

Yuan et al., Highly stable porous polymer networks with exceptionally high gas-uptake capacities. Adv Mater. 2011;23(32):3723-3725.

Zhao et al., Targeted synthesis of a 2D ordered porous organic framework for drug release. Chem Commun. 2011;47(22):6389-6391.

Extended European Search Report dated Jul. 12, 2016 for Application No. EP 13857155.9.

Comotti et al., Confined polymerization in porous organic frameworks with an ultrahigh surface area. Angew Chem Int Ed Engl. Oct. 1, 2012;51(40):10136-40. doi: 10.1002/anie.201205618.

Kelman et al., Crosslinking poly[1-(trimethylsilyl)-1-propyne] and its effect on physical stability. Journal of Membrane Science. Apr. 6, 2008;320(1-2):123-34.

Matteucci et al., Gas transport properties of MgO filled poly(1-trimethylsilyl-1-propyne) nanocomposites. Polymer. Jan. 11, 2008;49(6):1659-75.

Woo et al., Poly(1-trimethylsilyl-1-propyne)/MFI composite membranes for butane separations. Microporous and Mesoporous Materials. 2008;110(2-3):330-8.

\* cited by examiner

MIXED MATRIX POLYMER COMPOSITIONS

RELATED APPLICATIONS

This application is a U.S. National Stage application of International Patent Application No. PCT/AU2013/001369, filed Nov. 26, 2013, and entitled "Mixed Matrix Polymer Compositions," which claims priority under 35 U.S.C. §119 (e) to U.S. Provisional Patent Application Ser. No. 61/731, 409, filed Nov. 29, 2012, entitled "Polymer Compositions," and to U.S. Provisional Patent Application Ser. No. 61/729, 758, filed Nov. 26, 2012, entitled "Novel Membranes with Long-Term Gas Permeability Stability, and Methods of Preparing and Using Same," the contents of which are incorporated herein by reference in their entirety.

FIELD OF THE INVENTION

The present invention relates in general to mixed matrix polymer compositions. The polymer compositions are well suited for use as membranes in fluid separation, and it will therefore be convenient to describe the invention with an emphasis toward this application. However, it is to be understood that the polymer compositions according to the invention are not intended to be limited to this particular application.

BACKGROUND OF THE INVENTION

Fluid purification is an obligatory step for several industrial processes. For example, gas purification typically involves removal of water, carbon dioxide, or other unwanted gases that may interfere with the end use of the purified gas. Industrial gases that need to be purified before use include air, nitrogen, helium, argon, hydrogen, oxygen, and hydrocarbons.

Industrial gases also require careful purification before being released into the atmosphere. The most common contaminants present in these industrial gases are carbon dioxide, sulfur dioxide and trioxide, nitrogen oxides, hydrogen sulfide and small organic molecules. Removal of these impurities is important to reduce environmental pollution and minimize overall climate change. The most commonly used processes to purify gases on an industrial scale are liquid scrubbers (where a basic or acidic solution is used to absorb an acidic or basic gas, respectively), exchange resins (where immobilized bases or acids are used to absorb an acidic or basic gas, respectively), or membranes (which separate gases based on competitive adsorption, differences in diffusion rates, molecular discrimination, and/or sieving).

Separation membranes are likely to play an increasingly important role in reducing the environmental impact and the costs of industrial processes, because their use generates minimal amount of byproducts and has low energy footprint (Baker, 2002, Ind. & Eng. Chem. Res. 41(6):1393-1411; Koros, 2004, AIChE J. 50(10):2326-2334; Noble & Agrawal, 2005, Ind. & Eng. Chem. Res. 44(9):2887-2892). Commercially important gas separations include $H_2$ purification from light gases related to coal gasification, and $CO_2$ removal from $CH_4$ in natural gas processing, with gas molecule size differences ranging from 0.02 nm ($O_2/N_2$) to 0.09 nm ($H_2/CH_4$). Dense membranes can separate gas mixtures based on competitive adsorption and/or differences in diffusion rates, whereas porous membranes can separate gas mixtures via molecular discrimination or sieving (Wijmans & Baker, 1995, J. Membr. Sci. 107(1-2):1-21; Gin et al., 2008, Macromol. Rapid Comm. 29(5):367-389).

Certain organic polymers have been found to be particularly suitable for producing separation membranes on an industrial scale. Gas permeability in such polymer membranes is dominated by the diffusivity of the gas species throughout the polymer network. As the diffusivity is related to the mobility of gas molecules within the polymer, the differential transportation of gas species throughout a polymer membrane is believed to be dictated by two key parameters. These are (1) the accessible "free volume" of the polymer, and (2) the particular configuration of the pores and channels contributing to that free volume throughout the polymer mass, i.e. the "free-volume distribution".

A polymer's free volume is defined as the difference between the specific polymer volume in its glassy or rubbery state and the occupied volume associated with the material in its crystalline configuration extrapolated to zero Kelvin. The fractional free volume is the ratio between that difference and the polymer volume in its glassy or rubbery state at the given temperature. The fractional free volume can therefore be expressed in vol. % or volumetric fraction. The fractional free volume is therefore a measure of the residual "voids" that remain between the polymeric chains when these are inter-locked in their 3D arrangements.

On the other hand, the free-volume distribution relates to how the free volume is arranged spatially within the polymer, by way of interconnected porosity and channels. It is the free volume distribution that is of interest in understanding the mechanisms underlying the separation of fluid mixtures, since its configuration will dictate which molecules filters through the polymer and which molecules may remain adsorbed on the surface of the free volume pockets. While two polymers may have the same total free volume, they may have vastly differing transport properties based upon a different free volume distribution.

Ideally, separation membranes should exhibit both high flux and high selectivity.

Polymers suitable for use as separation membranes are generally characterized by fractional free volume values ranging from about 0.1 to about 0.5.

From a thermodynamic point of view, the molecular arrangement of polymer chains giving rise to a detectable free volume is one of non-equilibrium. As a result, such polymers tend to evolve into lower and more stable energy states over time. Consequently, the corresponding free volume tends to correspondingly collapse and diminish. This process is a commonly referred to as "relaxation" or "ageing" of the polymer. In the context of separation membranes, this phenomenon can dramatically affect the available free volume and free volume distribution for gas separation purposes. Indeed, a common problem affecting the performance of separation membranes is their reduced capability to maintain their permeability characteristics over time due to such ageing effects causing a dramatic reduction of the available free volume.

Polymers suitable for use as membranes in separation include polymers of intrinsic microporosity (PIMs), thermally rearranged (TR) polymers, hyperbranched polymers and substituted polyacetylenes.

Substituted polyacetylenes have been used to good effect as separation membranes. Polyacetylene is an organic polymer with the repeating unit (—CH═CH—). The polymer consists of a long chain of carbon atoms with alternating single and double bonds between them, each with one hydrogen atom. In substituted polyacetylenes, functional groups replace one or both of the hydrogen atoms in the repeating unit.

An example of the aforementioned aging phenomenon may be described with reference to poly (1-(trimethylsilyl)-1-propyne) (PTMSP), which is a substituted polyacetylene.

PTMSP is particularly suitable for gas separation applications due to its high fractional free volume. The high gas permeability of PTMSP is attributed to the fact that the polymer displays a large amount of fractional free volume in which the inter-chain void regions are highly interconnected (Srinivasan et al., 1994, J. Membr. Sci. 86(1-2):67-86). This free volume is the result of bulky side groups (trimethylsilyl groups) attached to the rigid polyacetylene backbone. However, because of the non-equilibrium state of the as-synthesized PTMSP, this initial large free volume in the material tends to collapse over time, resulting in a tremendous decrease in gas permeability. The physical "aging" and loss of permeability for PTMSP has been observed in numerous studies. For example, Nagai et al. reported a decrease of the permeability and diffusion coefficient of poly (1-trimethylsilyl-1-propyne-co-1-phenyl-1-propyne) membranes for various gases by 1 to 2 orders of magnitude after only 3 days (Nagai et al., 1995, J. Polym. Sci. Part B: Pol. Physics 33(2):289-298).

This degradation in properties hampers the use of substituted polyacetylenes in industrial applications. Several approaches have been explored to increase or stabilize the initially high gas permeabilities of PTMSP, such as physical blends preparation, polymer cross-linking, copolymer synthesis and functionalization. However, no study has solved the problem of the long-term stabilization of the desired gas permeation properties of any substituted polyacetylene (including PTMSP).

An opportunity therefore remains to develop new polymer compositions suitable for use as fluid separation membranes that exhibit improved permeability properties such as an extended period of time over which permeability is maintained (i.e. membranes that show reduced aging effects). Membranes prepared with such compositions should be useful for fluid separation processes, including but not limited to gas-phase separations.

SUMMARY OF THE INVENTION

The present invention provides a mixed-matrix composition comprising polymer having a fractional free volume of at least 0.1 and porous particles.

The present invention is at least in part predicated on the unexpected discovery that a mixed-matrix membrane (MMM) obtained from a mixed-matrix (MM) composition according to the invention can exhibit excellent fluid permeability for an extended period of time, relative to the same polymer having a fractional free volume of at least 0.1 absent the porous particles.

The present invention advantageously provides for a mixed-matrix composition that can be used to prepare a mixed-matrix membrane (MMM) in which the fractional free volume of the polymer matrix phase is maintained such that it does not decrease by more than 10%, or 8%, or 6%, or even 4% over a period of time of at least 50, at least 100, at least 200, or at least 250 days. For example, the fractional free volume of the polymer matrix phase of the MMM can advantageously decrease no more than about 1% to about 10% over a period of time of about 10 days to about 300 days.

Advantageously, the introduction of the porous particles can further impart increased porosity (i.e. total volume of interconnected pores relatively to the unit volume of the membrane) to MMMs compared to corresponding membranes made without the addition of the porous particles. Also, the addition of the porous particles can result in increased selectivity and permeability of the MMM to specific compounds compared to corresponding membranes without porous particles.

In one embodiment, the mixed-matrix composition is provided in the form of a mixed-matrix membrane. In that case, the invention provides a mixed-matrix membrane comprising polymer having a fractional free volume of at least 0.1 and porous particles. According to the composition of the invention, the polymer having a fractional free volume of at least 0.1 presents as a continuous polymer matrix phase and the porous particles are distributed throughout that matrix and present as a discontinuous particle phase. The composition therefore has a composite structure.

The present invention may therefore also be described as providing a polymer composite comprising (i) polymer having a fractional free volume of at least 0.1 in the form of a continuous polymer matrix phase, and (ii) porous particles distributed throughout the polymer matrix phase in the form of a discontinuous particle phase.

In one embodiment, the polymer composite is provided in the form of a mixed-matrix membrane. In that case, the invention provides a mixed-matrix membrane comprising (i) polymer having a fractional free volume of at least 0.1 in the form of a continuous polymer matrix phase, and (ii) porous particles distributed throughout the polymer matrix phase in the form of a discontinuous particle phase.

The present invention also provides a method of preparing a mixed-matrix composition, the method comprising the steps of (a) dissolving polymer having a fractional free volume of at least 0.1 in a liquid to form a polymer solution, (b) introducing porous particles to the polymer solution, and (c) subsequently removing at least a portion of the liquid to thereby form the mixed-matrix composition.

The present invention further provides a method of preparing a polymer composite comprising (i) a continuous polymer matrix phase, and (ii) porous particles distributed throughout the polymer matrix phase in the form of a discontinuous particle phase, the method comprising the steps of (a) dissolving polymer having a fractional free volume of at least 0.1 in a liquid to form a polymer solution, (b) introducing porous particles to the polymer solution, and (c) subsequently removing at least a portion of the liquid to thereby form the polymer composite.

The present invention also provides a method of performing separation of a component from a fluid mixture, the method comprising the steps of providing a fluid mixture comprising a component; contacting the fluid mixture with one surface of a mixed-matrix membrane comprising a polymer with a fractional free volume of at least 0.1 and porous particles; applying a driving force across the mixed-matrix membrane; and isolating a filtered composition from another surface of the mixed-matrix membrane, wherein the ratio of the component in the filtered composition is different from the ratio of the component in the fluid mixture so as to achieve separation of the component from the fluid mixture.

The present invention further provides a method of performing separation of a component in a fluid mixture, the method comprising the steps of providing a fluid mixture comprising a component; contacting the fluid mixture with one surface of a polymer composite (or mixed-matrix) membrane comprising (i) polymer having a fractional free volume of at least 0.1 in the form of a continuous polymer matrix phase, and (ii) porous particles being distributed throughout the polymer matrix phase in the form of a discontinuous particle phase; applying a driving force across the polymer composite (or mixed-matrix) membrane; and isolating a filtered composition from another surface of the polymer composite (or mixed-matrix) membrane, wherein the ratio of the component in the filtered composition is different from the ratio of the component in the fluid mixture so as to achieve separation of the component from the fluid mixture.

In some embodiments of the invention, the separation is size-selective.

As used herein, the expression "driving force" identifies a gradient of, for example, a chemical, mechanical or electrical property across the separation membrane, such as a composition gradient, pressure difference, or electrical voltage. Other suitable driving forces and appropriate means for providing them for the purpose of the invention would be known to those skilled in the art.

In one embodiment of the invention, the driving force is a pressure difference.

A porous "particle" according to the invention is intended to be a small unit of self-supporting matter. Provided it can be distributed throughout the polymer matrix of the polymer having a fractional free volume of at least 0.1, there is no particular limitation concerning the shape or size of the particles. Generally, the particles will have an average size ranging from about 20 nm to about 100 μm.

A "porous" particle in the context of the invention is therefore a self-supporting particle having voids in the form of channels and/or holes surrounded by continuous matter, wherein the channels and/or the holes can be interconnected thus providing a continuous path for fluid molecules to flow throughout the particle. The overall system of interconnected channels and/or holes constitutes the particle's porosity.

By the porous particles being "self-supporting" is meant that the particles substantially maintain their shape and size when used according to the invention. The porous particles will therefore generally be solid porous particles.

A desirable characteristic of the porous particles is their capability to adsorb on their surface (which includes their internal porous surface) certain fluid species in a selective, differential and reversible manner. That is, certain fluid species can have a tendency to get adsorbed on the porous surface stronger than other fluid species. This creates a differential diffusivity of fluid molecules through the particle's porosity depending on the nature of the fluid species.

Without wishing to be limited by theory, it is believed that by having a plurality of porous particles distributed throughout the continuous polymer matrix to form the mixed-matrix composition of the invention, the combined porosity characteristics of the polymer matrix (i.e. the fractional free volume) and the porosity of the particles allows for certain fluid molecules to flow continuously throughout the membrane while substantially preventing others from doing the same. Surprisingly, the resulting fluid permeability or imperviousness characteristics of, the mixed-matrix composition can be enhanced relative to the same characteristics afforded by the polymer matrix absent the particles. Furthermore, the mixed-matrix composition can advantageously exhibit excellent fluid permeability for an extended period of time, again relative to the polymer matrix absent the particles. This effect is believed to result from the porous particles stabilising the fractional free volume of the polymer matrix.

In one embodiment, the porous particles are in the form of carbonaceous porous aromatic frameworks (PAFs). Use of PAF's in accordance with the invention has been found to provide mixed-matrix compositions that demonstrate excellent properties as fluid separation membranes.

In certain embodiments of the present invention the porous particles are in the form of PAF particles, and in other embodiments, the PAF particles are in the form of PAF-1 particles.

In certain embodiments, the polymer having a fractional free volume of at least 0.1 is selected from polymers of intrinsic microporosity (PIMs), thermally rearranged (TR) polymers, hyperbranched polymers, substituted polyacetylenes and combinations thereof.

The present invention therefore also provides a mixed-matrix composition comprising porous particles and polymer selected from polymers of intrinsic microporosity (PIMs), thermally rearranged (TR) polymers, hyperbranched polymers, substituted polyacetylenes, and combinations thereof.

The present invention also provides a polymer composite comprising (i) polymer selected from polymers of intrinsic microporosity (PIMs), thermally rearranged (TR) polymers, hyperbranched polymers, substituted polyacetylenes, and combinations thereof, and (ii) porous particles, wherein the polymer is in the form of a continuous polymer matrix phase, and the porous particles are distributed throughout the polymer matrix phase in the form of a discontinuous particle phase.

In one embodiment, the substituted polyacetylene is PTMSP.

Mixed matrix compositions of the present invention may be used to prepare fluid (such as a gas) separation membranes useful in environmental remediation and industrial processes.

Mixed matrix compositions according to the present invention in the form of membranes can also be used in the separation of components from a fluid stream.

Apart form fluids in general, the membrane of the present invention can advantageously find applications in various industrial gas separation processes. Membranes according to the invention can find application in processes for the pre-combustion capture of $CO_2$ and $N_2$, and they show potential applicability for the separation of $CO_2$ from flue gases.

Further aspects and/or embodiments of the invention are discussed in more detail below.

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

Figure 1:
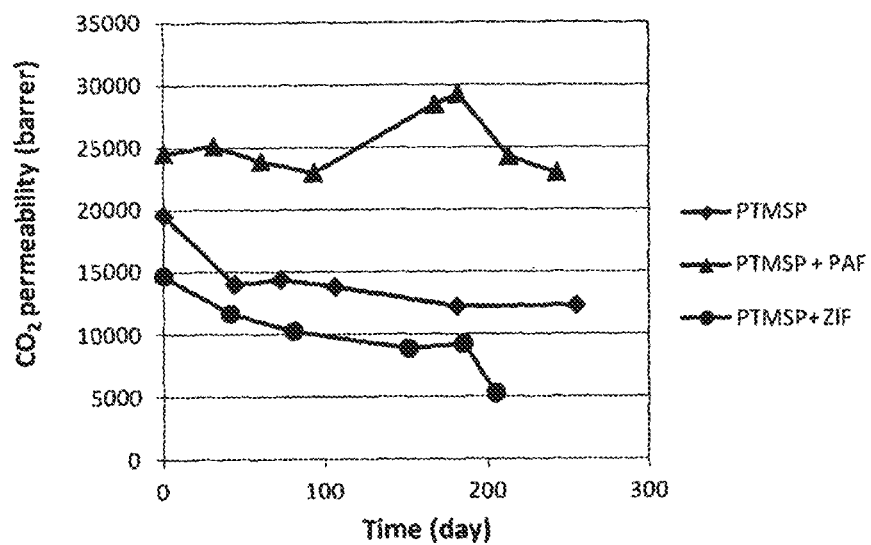
FIG. 1 is a graph illustrating the $CO_2$ permeabilities for the membranes comprising PTMSP (poly (1-(trimethylsilyl)-1-propyne)), PTMSP+PAF-1 (porous aromatic framework-1), and PTMSP+ZIF-8 (zinc-imidazolate framework-8) described in Example 1.

Some figures contain color representations or entities. Colored versions of the figures are available upon request.

Definitions

As used herein, each of the following terms has the meaning associated with it in this section.

As used herein, unless defined otherwise, all technical and scientific terms generally have the same meaning as commonly understood by one of ordinary skill in the art to which this invention belongs. Generally, the nomenclature used herein and the laboratory procedures in polymer science and organic chemistry are those well-known and commonly employed in the art.

As used herein, the articles "a" and "an" refer to one or to more than one (i.e. to at least one) of the grammatical object of the article. By way of example, "an element" means one element or more than one element.

As used herein, the term "about" will be understood by persons of ordinary skill in the art and will vary to some extent on the context in which it is used. As used herein, "about" when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed, methods.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

As used herein, the term "PTMSP" refers to poly (1-(trimethylsilyl)-1-propyne).

As used herein, the term "PMP" refers to poly(4-methyl-2-pentyne).

As used herein, the term "PAF" refers to porous aromatic framework.

As used herein, the term "ZIF-8" refers to zinc-imidazolate framework-8.

As used herein, the term "mixed-matrix" or "MM" refers to compositions of the invention comprising (i) polymer having a fractional free volume of at least 0.1, and (ii) porous particles, wherein the polymer having a fractional free volume of at least 0.1 is in the form of a continuous polymer matrix phase, and the porous particles are distributed throughout the polymer matrix phase in the form of a discontinuous particle phase. The mixed matrix may therefore also be described herein as a polymer composite material.

For convenience, the polymer having a fractional free volume of at least 0.1 may be described simply as the "polymer matrix" or the "polymer matrix phase".

As used herein, the term "mixed-matrix membrane" or "MMM" refers to a membrane comprising the mixed-matrix composition.

As used herein, a "membrane" is a barrier that can be used for separating two fluids and allows transport between the fluids.

As used herein, a composition "embedded" in a porous support is a composition that has, at least partially, penetrated the surface of the porous support, whereby a portion of the composition is located within the porous support. In one embodiment, the portion is 100%, about 95%, about 90%, about 85%, about 80%, about 75%, about 70%, about 65%, about 60%, about 55%, about 50%, about 45%, about 40%, about 35%, about 30%, about 25%, about 20%, about 15%, about 10%, or about 5%, of the composition.

As used herein, the term "Barrer" is a non-SI unit of gas permeability, wherein 1 Barrer=$10^{-11}$ (cm$^3$ gas)·cm·cm$^{-2}$·s$^{-1}$·mmHg$^{-1}$. or 1 Barrer=$10^{-10}$ (cm$^3$ gas)·cm·cm$^{-2}$·s$^{-1}$·cmHg$^{-1}$. The term "cm$^3$ gas" represents a molar quantity of gas (i.e., the quantity of gas that would take up one cubic centimeter at standard temperature and pressure, as calculated via the ideal gas law), rather than a true volume. The term "cm" represents the thickness of the material which permeability is being evaluated, and the term "cm$^{-2}$" represents the reciprocal of the surface area of that material.

As used herein, the term "polymer" refers to a molecule composed of repeating structural units typically connected by covalent chemical bonds. The term "polymer" is also meant to include the terms copolymer and oligomers.

As used herein, a "monodisperse" pore size has a variation in pore size from one pore to another of less than about 15% (specifically, an ideally narrow Poisson distribution). For pores which dimensions vary along the pore channel, a comparison of pore sizes is made at equivalent positions along the channel. In one embodiment, the pore size is monodisperse when measured in this way. In one embodiment, the pore size may be measured by its minimum dimension. In one embodiment, the effective pore size of the structure may be determined by the size of the solute that can be excluded from the pore manifold.

As used herein, the language "salt" refers to a salt of a compound prepared from acceptable acids including inorganic acids, organic acids, solvates, hydrates, or clathrates thereof. Suitable acid addition salts may be prepared from an inorganic acid or from an organic acid. Examples of inorganic acids include sulfate, hydrogen sulfate, hydrochloric, hydrobromic, hydriodic, nitric, carbonic, sulfuric, and phosphoric acids (including hydrogen phosphate and dihydrogen phosphate). Organic acids may be selected from aliphatic, cycloaliphatic, aromatic, araliphatic, heterocyclic, carboxylic and sulfonic classes of organic acids, examples of which include formic, acetic, propionic, succinic, glycolic, gluconic, lactic, malic, tartaric, citric, ascorbic, glucuronic, maleic, fumaric, pyruvic, aspartic, glutamic, benzoic, anthranilic, 4-hydroxybenzoic, phenylacetic, mandelic, embonic (pamoic), methanesulfonic, ethanesulfonic, benzenesulfonic, pantothenic, trifluoromethanesulfonic, 2-hydroxyethanesulfonic, p-toluenesulfonic, sulfanilic, cyclohexylaminosulfonic, stearic, alginic, β-hydroxybutyric, salicylic, galactaric and galacturonic acid. Acceptable base addition salts include, for example, metallic salts including alkali metal, alkaline earth metal and transition metal salts such as, for example, calcium, magnesium, potassium, sodium and zinc salts. Acceptable base addition salts also include organic salts made from basic amines such as, for example, N,N'-dibenzylethylene-diamine, chloroprocaine, choline, diethanolamine, ethylenediamine, meglumine (N-methylglucamine) and procaine. All of these salts may be prepared from the corresponding compound by reacting, for example, the appropriate acid or base with the compound.

As used herein, the term "instructional material" includes a publication, a recording, a diagram, or any other medium of expression that may be used to communicate the usefulness of the compositions of the invention. In one embodiment, the instructional material may be part of a kit useful for generating a system of the invention. The instructional material of the kit may, for example, be affixed to a container that contains the compositions of the invention or be shipped together with a container that contains the compositions. Alternatively, the instructional material may be shipped separately from the container with the intention that the recipient uses the instructional material and the compositions cooperatively. For example, the instructional material is for use of a kit; instructions for use of the compositions; or instructions for use of a formulation of the compositions.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DETAILED DESCRIPTION OF THE INVENTION

The mixed-matrix composition comprises polymer having a fractional free volume of at least 0.1. As used herein "fractional free volume" is a reference to the fractional free volume of the polymer that is calculated from the measured specific volume and calculated occupied volume using the group contribution method according to the procedure described in Freeman, B. D., Hill, A. J. *Structure and Properties of Glassy Polymers*, M. R. Tant, A. J. Hill, Eds. 1998, ACS Books: Washington D.C., pages 306-325.

The polymer matrix will generally have a fractional free volume ranging from 0.1 to about 0.5, or from 0.1 to about 0.45, or from 0.1 to about 0.4, or from about 0.15 to about 0.5, or from about 0.15 to about 0.45, or from about 0.15 to about 0.4, or from about 0.2 to about 0.5, or from about 0.2 to about 0.45, or from about 0.2 to about 0.4.

Polymers that can provide for a fractional free volume of at least 0.1 include polymers of intrinsic microporosity (PIMs), thermally rearranged (TR) polymers, hyperbranched polymers and substituted polyacetylenes. Notably, not all polymers within these general classes will inherently have a fractional free volume of at least 0.1. The fractional free volume of a given polymer can be determined as outlined herein.

PIMs are generally defined as polymers that contain a tetrahedral carbon as a point of contortion. PIMs can comprise organic planar macromolecules interconnected by rigid linkers. The linkers have at least one point of contortion, which results in the two planar macromolecules being connected and rigidly linked together in a non-coplanar orientation. The point of contortion may be, for example, a Spiro group, a bridged ring moiety or a covalent bond around which there is restricted rotation. The chains and macromolecules forming the structure of PIMs are therefore prevented from being efficiently packed together, thus resulting in formation of extended voids throughout the whole polymer network. A particular advantage of PIMs is that their intrinsic porosity results mainly from the peculiar and "forced" arrangements of their macromolecules, and does not significantly derive from the thermal history of the material. Examples of PIMs include polyphtalocyanines, polyspirobisindanes and polybenzidioxanes.

TR polymers are generally defined as polymers that undergo a structural rearrangement upon heating, resulting in a dramatic increase of their free volume. Their fractional free volume can reach values up to 0.3, making these polymers excellent candidates for gas separation applications. In general, the structure of TR polymers comprises a hetero-aromatic domain, and includes polybenzoxazoles and polybenzimidazoles. These polymers are characterized by interconnected microporosity within a glassy polymer matrix. During thermal rearrangement, typically at 450° C., the interconnected porosity forms through a solid-state conversion of polyimide to polybenzoxazole. The pore size of TR polymers presents a bimodal distribution with pores of 0.3-0.4 nm and 0.7-0.9 nm in size, which provide rapid and selective diffusion for small gas and ion molecules. Also, the pore size of TR polymers can be tuned by simple thermal treatment.

Hyperbranched polymers are highly branched macromolecules with three-dimensional dentritic architecture. There are six known dendritic architectures, consisting in (a) dendrons and dendrimers; (b) linear-dendritic hybrids; (c) dendrigrafts or dendronized polymers; (d) hyperbranched polymers; (e) multi-arm star polymers; (f) hypergrafts or hypergrafted polymers. A review of these polymers can be found in C. Gao, D. Yan, *Hyperbranched polymers: from synthesis to applications*, Prog. Polym. Sci. 29 (2004) 183-275. This class of polymers includes polyimides, hyper-crosslinked polymer networks.

A further class of polymer with high fractional free volume is that of substituted polyacetylenes. Substituted polyacetylenes are typically more thermally stable than polyacetylene in air (Masuda, 2007, J. Polym. Sci. Part A: Polym. Chem. 45:165), with their stability increasing with increasing number or bulkiness of the substituents. Substituted polyacetylenes derived from aromatic disubstituted acetylenes are highly stable (e.g., no oxidation or degradation in air at 160° C. after 20 h). Substituted polyacetylenes derived from aliphatic disubstituted acetylenes are moderately stable at room temperature, while they easily degrade at higher temperature. Substituted polyacetylenes typically do not undergo degradation in vacuum at 120° C. Tensile measurements at 25° C. show that polyacetylenes with phenyl groups are generally hard and brittle, whereas those with long n-alkyl groups are soft and ductile. Some substituted polyacetylenes are known to have high gas permeability (Masuda et al., 1983, J. Am. Chem. Soc. 105:7473-7474).

Within the class of substituted polyacetylenes, poly (1-(trimethylsilyl)-1-propyne) (PTMSP) is known for its high gas permeabilities but low selectivities ($O_2$ permeability=7,000 Barrer, $O_2/N_2$ selectivity=2) (Masuda et al., 1983, J. Am. Chem. Soc. 105(25):7473-7474). Because of its unique gas transport properties, this glassy polymer has great potential for pervaporation (i.e., separation of mixtures of liquids by partial vaporization through a porous membrane) or gas separation applications, such as $CO_2$ capture. Indeed, the $CO_2$ permeability of PTMSP is 28,000 Barrer (Ichiraku et al., 1987, J. Membr. Sci. 34(1):5-18), whereas traditional polymers typically exhibit $CO_2$ permeability values below 100 Barrer (Du et al., 2012, Energy & Envir. Sci. 5(6):7306).

In some embodiments, the mixed-matrix composition comprises substituted polyacetylene and porous particles.

In a further embodiment, the mixed-matrix composition is in the form of a membrane.

Suitable substituted polyacetylenes include poly (1-(trimethylsilyl)-1-propyne) (PTMSP), poly (1-(dimethyl-n-propylsilyl)-1-propyne), poly (1-(dimethyl-n-butylsilyl)-1-propyne), poly (1-phenyl-1-propyne)poly (diphenylacetylene), poly (t-butylacetylene), poly (1-phenyl-2-p-trimethylsilyl-phenyl-acetylene), poly (1-phenyl-2-p-hydroxyphenyl-acetylene), co-polymers thereof, or any mixtures thereof.

Substituted polyacetylenes may be prepared according to the methods known to those skilled in the art (Masuda, 2007, J. Polym. Sci.: Part A: Polym. Chem. 45:165-180).

A variety of porous particles, both in terms of pore size and composition, can advantageously be used in accordance with the invention.

For example, the pores of the porous particles may have a median diameter of less than about 100 μm. In one embodiment, the pores can have a median diameter of about 0.10 μm to about 10 μm, with no particular distribution of shape or size required.

The porous particles may be microporous. By being "microporous" is meant that the particles have interconnecting holes and orifices (i.e. the pores) with an average size of less than 2 nm (micropores).

The porous particles may be mesoporous. By being "mesoporous" is meant that the particles have interconnecting holes and orifices (i.e. the pores) with an average size in the range of 2-50 nm (mesopores).

The porous particles may be macroporous. By being "macroporous" is meant that the particles have interconnecting holes and orifices (i.e. the pores) with an average size larger than 50 nm (macropores).

In certain embodiments, the porous particles are microporous particles, i.e. having pores of average size of less than 2 nm.

In other embodiments, the porous particles are mesoporous particles, i.e. having pores of average size between 2 nm and 50 nm.

In yet other embodiments, the porous particles are macroporous particles, i.e. having pores of average size of at least 50 nm.

In further embodiments, the porous particles may comprise any combination of at least two of micropores, mesopores and macropores.

The overall porosity volume of the porous particles will typically range from about 20 to about 90% of the total volume of the porous particle. In one embodiment, the porosity volume ranges from about 30 to about 80%. In yet another embodiment, the porosity volume ranges from about 50 to about 80%.

The porous particles are typically substantially uniformly distributed throughout the polymer matrix.

Porous particles suitable for use in accordance with the invention include porous metal particles, porous metal oxide particles, metal organic frameworks (MOFs) particles and PAF particles.

In some embodiments, the porous particles are porous metal particles, which may be porous Cu, Ag, Au, Ni, Pd, Pt or any other transition metal porous particles. Such particles can be obtained through any synthetic method that would be known to those skilled in the art.

In other embodiments, the porous particles are porous metal oxide particles, for example porous metal oxide particles selected from aluminium oxide, chromium(ii) oxide, chromium(iii) oxide, chromium(iv) oxide, chromium(vi) oxide, cobalt(ii) oxide, cobalt(ii, iii) oxide, cobalt(iii) oxide, copper(i) oxide, copper(ii) oxide, iron(ii) oxide, iron(ii, iii) oxide, iron(iii) oxide, lithium oxide, magnesium oxide, manganese(ii) oxide, manganese(iii) oxide, manganese(iv) oxide, manganese(vii) oxide, nickel(ii) oxide, nickel(iii) oxide, silicon dioxide, tin(ii) oxide, tin(iv) oxide, titanium dioxide, and zinc oxide.

In yet further embodiments, the porous particles are MOF particles. Examples of MOF particles those disclosed in WO 2010/075610, the contents of which is included herein as reference in its entirety.

In one embodiment, the porous particles are porous aromatic frameworks (PAF's). PAF is a type of porous organic framework characterized by a rigid aromatic open-framework structure constructed by covalent bonds (Ben et al., 2009, Angew. Chem., Intl Ed. 48:9457; Ren et al., 2010, Chem. Commun. 46:291; Peng et al., 2011, Dalton Trans. 40:2720; Ben et al., 2011, Energy Environ. Sci. 4:3991; Ben et al., J. Mater. Chem. 21:18208; Ren et al., J. Mater. Chem. 21:10348; Yuan et al., 2011, J. Mater. Chem. 21:13498; Zhao et al., 2011, Chem. Commun. 47:6389; Ben & Qiu, 2012, Cryst Eng Comm, DOI:10.1039/c2ce25409c). PAFs show high surface areas and excellent physicochemical stability, generally with long range orders and, to a certain extent, an amorphous nature.

Non-limiting examples of PAFs include PAF-1 (also known as PAF-302), PAF-3, PAF-4, PAF-11 (also known as PAF-304), PAF-301, PAF-303, JUC-Z1, JUC-Z2, PPN-4, PPN-5, PPN-6-$SO_3$H, PPN-6-$SO_3$Li, or any mixtures thereof. PAFs useful within the compositions of the invention may be obtained from commercial sources or prepared according to methods known to those skilled in the art (Ben & Qiu, 2012, Cryst Eng Comm, DOI:10.1039/c2ce25409c).

In some embodiments, the porous particles of the present invention, for example porous PAF-1 particles, have an average pore size in the range of from about 0.2 to about 10 nm, from about 0.2 to about 7 nm, from about 0.2 to about 5 nm, from about 0.5 to about 5 nm, from about 0.5 to about 4 nm, from about 0.5 to about 3 nm, from about 0.5 to about 2 nm, or from about 1 to about 2 nm.

In some embodiments, the porous particles have an average size of between about 20 nm to about 100 μm, between about 20 nm and 50 μm, between about 20 nm and 10 μm, between about 20 nm and 5 μm, between about 20 nm and 1 μm, between about 20 nm and 800 nm, between about 20 nm and 500 nm, or between about 20 nm and 100 nm.

In some embodiments, the amount of porous particles in the composition of the present invention are between about 0.1% wt. and about 50% wt., or between about 0.1% wt. and about 40% wt., or between about 0.1% wt. and about 30% wt., or between about 0.1% wt. and about 20% wt., or between about 1% wt. and about 15% wt., or between about 5% wt. and about 10% wt., or about 10% wt.

In some embodiments, the porous particles of the present invention, have a measured BET surface area (measured from $N_2$ adsorption isotherms at 87K) of from about 100 to about 10000 $m^2/g$, from about 100 to about 9000 $m^2/g$, from about 100 to about 8000 $m^2/g$, from about 100 to about 7000 $m^2/g$, from about 300 to about 5000 $m^2/g$, from about 400 to about 4000 $m^2/g$, from about 500 to about 4000 $m^2/g$, from about 600 to about 3800 $m^2/g$, from about 750 to about 3000 $m^2/g$, from about 1000 to 2500 $m^2/g$, or from about 1000 to 2000 $m^2/g$.

The polymer having a fractional free volume of at least 0.1 and/or the porous particles may be provided with one or more functional groups. Techniques such as water plasma treatment, ozone treatment, ammonia treatment and hydrogen treatment may be used to introduce functional groups to the polymer and/or the porous particles. Further, one or more functional groups may also be attached to an additional chemical component of the composition.

In one embodiment, the one or more functional groups interact selectively and reversibly with a molecule that permeates the composition of the invention. In another embodiment, the one or more functional groups (i) interact selectively with a molecule that permeates the composition of the invention, and (ii) catalyzes the conversion of the molecule into another molecule.

Suitable functional groups that may be provided on the polymer matrix and/or the porous particles include —NHR, —N(R)$_2$, —NH$_2$, —NO$_2$, —NH(aryl), halides, aryl, aralkyl, alkenyl, alkynyl, pyridyl, bipyridyl, terpyridyl, anilino, —O(alkyl), cycloalkyl, cycloalkenyl, cycloalkynyl, sulfonamido, hydroxyl, cyano, —(CO)R, —(SO$_2$)R, —(CO$_2$)R, —SH, —S(alkyl), —SO$_3$H, —SO$^{3-}$M$^+$, —COOH, COO$^-$M$^+$, —PO$_3$H$_2$, —PO$_3$H$^-$M$^+$, —PO3$^{2-}$M$^{2+}$, —CO$_2$H, silyl derivatives, borane derivatives, ferrocenes and other metallocenes. In the chemical formulas listed above, M is a metal atom, and R is C$_{1-10}$ alkyl.

In other embodiments, PAF particles, for example PAF-1 particles, are functionalized with at least one of the functional groups listed above.

In one embodiment, PAF-1 porous particles are functionalized with —NH$_2$ or —SO$_3$H groups.

In some embodiments, the porous particles comprise carbon based macromolecules. The porous particles may be infiltrated or doped with carbon based macromolecules, such that the macromolecules occupy some of the pores of the particles. In that case, the carbon based macromolecules may or may not be covalently bonded to the porous particles.

Examples of suitable carbon based macromolecules include carbon molecular cages, for example fullerene, fullerene-like molecules, and/or chemically functionalised carbon molecular cages including fullerides.

Chemically functionalised carbon molecular cages, which include chemically functionalised fullerenes and/or fullerides, may comprise at least one of lithium, magnesium, aluminium, sodium, potassium, cesium, calcium, strontium, and one or more transition metals. In one embodiment, the chemically functionalized fullerenes or fullerides are lithium, magnesium, and/or aluminium decorated fullerenes or fullerides, for example lithium and/or magnesium decorated fullerenes or fullerides.

Functionalised fullerenes or fullerides can be based on spherical or ellipsoidal fullerene.

The carbon cage molecules, including fullerene and fulleride molecules, may be based on carbon structure in range of $C_{20}$ to $C_{84}$.

Examples of carbon cage molecules useful for these embodiments of the invention can be found in WO 2010/075610, which is included herein as reference in its entirety.

In some embodiments, the amount of fullerene, chemically functionalized fullerene or fulleride inside the porous particles is between about 1% wt. to about 20% wt., between about 2.5% wt. to about 15% wt., between about 5% wt. to about 10% wt. about 5% wt., or about 10% wt, with reference to the weight of the porous particles.

In some embodiments, the porous particles comprise a fullerene and/or a fulleride, wherein the fulleride comprises lithium, magnesium, and/or aluminium decorated fullerenes.

In some embodiments, the porous particles are PAF-1, and the PAF-1 comprises a fullerene and/or a fulleride, wherein the fulleride comprises lithium, magnesium, and/or aluminium decorated fullerenes.

Surprisingly, it has been found that porous particles provided with one or more functional groups and/or comprising carbon based macromolecules afford mixed matrix compositions that exhibit improved properties relative to the mixed matrix compositions where the porous particles are not provided with one or more functional groups and/or comprising carbon based macromolecules.

Mixed matrix compositions according to the invention may be prepared by combining pre-formed polymer matrix with the porous particles, or monomer may be polymerized so as to form the polymer matrix in the presence of the porous particles.

The particle size of the polymer and the porous particle may be adjusted, either separately or as part of a mixture, by methods known to those skilled in the art, such as but not limited to cryogrinding, room temperature grinding or sonication.

In one embodiment, the mixed matrix compositions according to the invention are prepared by dissolving the polymer matrix in a liquid to form a liquid solution. The porous particles can be introduced to the liquid before or during the dissolution step or added to the polymer solution after the polymer has dissolved. Generally, the porous particles do not dissolve in the liquid. In other words, the porous particles will be substantially insoluble in the liquid.

In one embodiment, substituted polyacetylene and porous particles are contacted with a liquid, whereby stirring promotes complete or partial dissolution of the substituted polyacetylene in the liquid to form a suspension comprising dissolved or partially dissolved substituted polyacetylene and suspended porous particles.

Suitable liquids contemplated for use in such embodiments include methanol, ethanol, n-propanol, isopropanol, tetrahydrofuran, methylene chloride, chloroform, diethyl ether, room temperature ionic liquids, ethylene glycol, glycerol, formamide, N-methylformamide, dimethylformamide, N-methylsydnone, an aqueous solution thereof, or any mixtures thereof.

In one embodiment, the liquid is selected for solvent casting of the mixed-matrix composition. The solvent may be a low boiling point organic solvent, or a mixture of one or more of such solvents. Useful solvents include, but are not limited to, methanol and diethyl ether.

Upon formation of the suspension of matrix polymer and porous particles in the liquid, some or all of the liquid may is removed (e.g., by natural evaporation or under vacuum) to generate a solid or viscous mixed-matrix composition.

The mixed-matrix composition may be formed or molded in any desired shape, such as a membrane or a filter pad.

The mixed-matrix composition may also be deposited on a porous support to generate a supported membrane. In that context, a supported membrane will be understood as the combination of the porous support and the mixed-matrix composition. Porous supports of varying pore size may be used within the invention, generating final supported membranes of distinct porosity. In one embodiment, the mixed-matrix composition is localized on the surface of the porous support and does not penetrate the porous support appreciably. In another embodiment, the mixed-matrix composition penetrates at least a fraction of the thickness of the support. In yet another embodiment, the mixed-matrix composition is present throughout the thickness of the support, so that the thickness of the supported membrane may be taken as the thickness of the porous support itself.

During preparation of a supported membrane, the mixed-matrix composition may be applied to only a portion of the surface of the porous support. In one embodiment, the portion is 100%, about 95%, about 90%, about 85%, about 80%, about 75%, about 70%, about 65%, about 60%, about 55%, about 50%, about 45%, about 40%, about 35%, about 30%, about 25%, about 20%, about 15%, about 10%, or about 5%. The mixed-matrix composition may be retained within the support by mechanical interlocking of the mixed-matrix composition with the support. In one embodiment, the mixed-matrix composition is applied by solvent casting on the porous support. In another embodiment, the mixed-matrix composition is applied a multitude of times to the porous support, in order to obtain the desired membrane thickness.

In one embodiment, the mixed-matrix composition is attached to the porous support. In another embodiment, the mixed-matrix composition forms a layer on the surface of the support. In yet another embodiment, the thickness of the layer is about 10 microns, about 5 microns, about 2 microns, about 1 micron, or about 0.5 microns.

In one embodiment, the porous support is hydrophilic. As used herein, a hydrophilic porous support is wettable by water and capable of spontaneously absorbing water. The hydrophilic nature of the porous support may be measured by methods known to those skilled in the art, including measurement of the contact angle of a drop of water placed on the membrane surface, the water absorbency (weight of water absorbed relative to the total weight, U.S. Pat. No. 4,720,343) and the wicking speed (U.S. Pat. No. 7,125,493). The observed macroscopic contact angle of a drop of water placed on the membrane surface may change with time. In one embodiment, the contact angle of a 2 µL drop of water placed on the support surface (measured within 30 seconds) is less than about 90 degrees, from about 5 degrees to about 85 degrees, about zero degrees to about 30 degrees or is about 70 degrees. In another embodiment, the membrane is fully wetted by water and soaks all the way through the membrane after about one minute. Hydrophilic polymeric supports include supports formed of hydrophilic polymers and supports that have been modified to make them hydrophilic. In another embodiment, the support is hydrophobic.

In one embodiment, the porous support has a smaller flow resistance than the mixed-matrix membrane. In another embodiment, the porous support is selected so that the diameter of the pores is less than about 10 microns and greater than the effective pore size of the mixed-matrix composition. In yet another embodiment, the porous support has a pore size less than about 0.1 micron or from 0.1 micron to 10 microns. The preferred pore size of the support may depend on the composition of the mixed-matrix composition. The characteristic pore size of the membrane may depend on the method used to measure the pore size. Methods used in the art to determine the pore size of membranes include scanning electron microscopy analysis, capillary flow porometry analysis (which gives a mean flow pore size), measurement of the bubble pressure (which gives the largest flow pore size), and porosimetry.

The porous support may provide physical strength to the mixed-matrix membrane. When the mixed-matrix membrane is somewhat brittle, the porous support can also add flexibility. The porous support should also be thermally stable over approximately the same temperature range as the mixed-matrix membrane to be used.

The porous support is selected to be compatible with the solution used for mixed-matrix membrane formation, as well as to be compatible with the liquid or gas to be filtered. When the solution used for mixed-matrix membrane fabrication and the support are compatible, the support is resistant to swelling and degradation by the solution used to cast the mixed-matrix membrane. Swelling and/or degradation of the support by the solvent may lead to changes in the pore structure of the support. In one embodiment, if the membrane is to be used for water based separations, the porous support is sufficiently hydrophilic for water permeation.

The porous support may be made of any suitable material known to those skilled in the art including polymers, metals, and ceramics. In various embodiments, the porous polymer support comprises polyethylene (including high molecular weight and ultra-high molecular weight polyethylene), polyacrylonitrile (PAN), polyacrylonitrile-co-polyacrylate, polyacrylonitrile-co-methylacrylate, polysulfone (PSf), Nylon 6,6, Teflon, poly(vinylidene difluoride), or polycarbonate. In one embodiment, the support may be a polyethylene support or a support of another polymer mentioned above (which may include surface treatments to affect the wettability of the support). The support may also be an inorganic support such as a nanoporous alumina disc (Anopore J Whatman, Ann Arbor, Mich.).

In one embodiment where the mixed-matrix composition is embedded into the porous support, a quantity of the mixed-matrix composition is placed on a surface of the porous support and then infused into the porous support. In one embodiment, the support is impregnated with the mixed-matrix mixture using a combination of heat and pressure to drive the mixed-matrix composition into the pores of the support. The mixed-matrix composition and support may be heated to decrease the viscosity of the mixed-matrix composition before pressure is applied. In one embodiment, a heated press may be used to impregnate the support with the mixed-matrix composition. When a press is used, the mixed-matrix composition and porous support may be sandwiched between a pair of load transfer plates. Additionally, a pair of polymeric sheets may be used to facilitate release of the support mixture and membrane from the load transfer plates and limit evaporation of liquid from the mixture. Suitable dense polymeric sheets include, but are not limited to, Mylar® (a biaxially-oriented polyester film made from ethylene glycol and dimethyl teraphthalate). The mixed-matrix composition need not completely fill the pore space of the support, but fills enough of the pore space of the support so that separation process is controlled by the pores of the mixed-matrix composition. In one embodiment, the gel is pushed uniformly through the entire porous support thickness.

The invention further provides a method of preparing a mixed-matrix composition comprising polymer having a fractional free volume of at least 0.1 and porous particles. In one embodiment, the invention provides a method of preparing a mixed-matrix composition comprising substituted polyacetylene and porous particles.

The invention also includes a method of preparing a supported membrane. That method comprises providing a mixed-matrix composition according to the invention, optionally wherein the mixed-matrix composition is dissolved or suspended in a liquid. The method further comprises applying the mixed-matrix composition to at least a portion of the surface of a porous support, whereby the composition is attached at least to the portion of the surface of the porous support, thereby generating the supported membrane.

In one embodiment, the portion is 100%, about 95%, about 90%, about 85%, about 80%, about 75%, about 70%, about 65%, about 60%, about 55%, about 50%, about 45%, about 40%, about 35%, about 30%, about 25%, about 20%, about 15%, about 10%, or about 5%.

The invention further includes a method of separating a component from a first fluid mixture. The method comprises the step of bringing the first fluid mixture into contact with the inlet side of a separation membrane of the present invention. The method further comprises the step of applying a driving force across the separation membrane. The method further comprises the step of withdrawing from the outlet side of the separation membrane a second fluid mixture, wherein the proportion of the component in the second fluid mixture is depleted or enriched as compared with the first fluid mixture.

The method of the invention can also be described as a process for separating a component from a fluid mixture that contains the component, the process comprising contacting the fluid mixture with the membrane according to the invention; providing a driving force, for example a difference in pressure, across the membrane to facilitate transport of the component through the membrane such that a separated fluid mixture is provided, wherein the concentration of the component in the separated fluid mixture is higher than the concentration of the component in the fluid mixture that was subjected to separation.

In one embodiment, the fluid mixture is liquid or gaseous mixture. In another embodiment, the component is an organic molecule, ion, gas, impurity or contaminant. In one embodiment, the proportion of the component in the second fluid mixture or in the separated fluid mixture is depleted or enriched as compared with the first fluid mixture by about 10,000%, about 8,000%, about 6,000%, about 4,000%, about 2,000%, about 1,000%, about 900%, about 800%, about 700%, about 600%, about 500%, about 400%, about 300%, about 200%, about 100%, about 80%, about 60%, about 40%, about 20%, about 10%, or about 5%.

The invention further includes a method of size-selective filtration of solutions using the membranes of the invention. In one embodiment, one or more components, such as nanometer-size impurities, organic molecules, ions, and other contaminants, may be removed from solution by selecting the pore diameter of the membrane to be smaller than the molecular size of the component(s) of interest. The method comprises providing a fluid mixture comprising a component. The method further provides contacting the fluid mixture with one surface of a mixed-matrix membrane comprising a polymer having a fractional free volume of at least 0.1, for example a substituted polyacetylene, and porous particles. The method further provides applying a pressure difference across the mixed-matrix membrane. As appreciated by one skilled in the art, the pressure difference should be such that the mixed-matrix membrane is not ruptured, but yet the mixture is forced through the membrane. The method further provides isolating a filtered composition from another surface of the mixed-matrix membrane, wherein the ratio of the component in the filtered composition is distinct from the ratio of the component in the fluid mixture, whereby separation of the component from the fluid mixture is performed. In one embodiment, the ratio of the component in the filtered composition is distinct from the ratio of the component in the fluid mixture by about 10,000%, about 8,000%, about 6,000%, about 4,000%, about 2,000%, about 1,000%, about 900%, about 800%, about 700%, about 600%, about 500%, about 400%, about 300%, about 200%, about 100%, about 80%, about 60%, about 40%, about 20%, about 10%, or about 5%.

A "filtered composition" as used herein will be understood as also encompassing the "second fluid mixture" or the "separated fluid mixture" of previously described embodiments.

As used herein, the expression "another surface" will be understood as also encompassing a surface that is opposite to the surface with which the fluid mixture is contacted.

In one embodiment, the substituted polyacetylene is selected from poly (1-(trimethylsilyl)-1-propyne) (PTMSP), poly (1-(dimethyl-n-propylsilyl)-1-propyne), poly (1-(dimethyl-n-butylsilyl)-1-propyne), poly (1-phenyl-1-propyne) poly (diphenylacetylene), poly (t-butylacetylene), poly (1-phenyl-2-p-trimethylsilylphenyl-acetylene), poly (1-phenyl-2-p-hydroxyphenyl-acetylene), co-polymers thereof, and any mixtures thereof.

In another embodiment, the porous particle comprises a porous PAF selected from PAF-1 (PAF-302), PAF-3, PAF-4, PAF-11 (PAF-304), PAF-301, PAF-303, JUC-Z1, JUC-Z2, PPN-4, PPN-5, PPN-6-$SO_3H$, a salt thereof, and any mixtures thereof.

In yet another embodiment, the mixed-matrix membrane is embedded within a porous support or deposited as a layer on the surface of a porous support. In yet another embodiment, the fluid mixture is a gas or a liquid.

Advantageously, aging of membranes obtained using the mixed-matrix composition of the present invention is reduced compared to existing and traditional separation membranes.

In the context of the invention, reduced aging of a membrane indicates that the fractional free volume of the polymer matrix phase can be maintained such that it does not decrease more than about 10% over a period of time of up to 250 days.

In some embodiments, the fractional free volume of the polymer matrix phase can be maintained such that it does not decrease more than 9%, more than 8%, more than 7%, more than 6%, more than 5%, more than 4%, more than 3%, more than 2% or more than 1% over a period of time of up to 250 days. In some embodiments, such period of time may be up to 10 days, up to 25 days, up to 50 days, up to 100 days, up to 150 days, or up to 200 days. It will be understood that any combination between each tolerable reduction % of the fractional free volume of the polymer matrix phase and each period of time listed above is acceptable for the purpose of the present invention.

The invention further includes a method of promoting binding between a first compound and at least one functional group in a mixed-matrix composition. The method comprises providing a fluid mixture comprising a first compound. The method further comprises contacting the fluid mixture with a mixed-matrix composition comprising a polymer having a fractional free volume of at least 0.1, for example a substituted polyacetylene, and porous particles, wherein the mixed-matrix composition further optionally comprises an additional chemical component, and wherein at least one of the polymer having a fractional free volume of at least 0.1, the porous particle or optional additional chemical component is functionalized with at least one functional group. The first compound binds to the at least one functional group in the mixed-matrix composition.

In one embodiment, binding of the first compound and the at least one functional group is reversible. In another embodiment, binding of the first compound and the at least one functional group is irreversible.

The invention further includes a method of catalyzing the conversion of a first compound into a second compound. The method comprises providing a fluid mixture comprising a first compound. The method further comprises contacting the fluid mixture with a mixed-matrix composition comprising a polymer having a fractional free volume of at least 0.1, for example a substituted polyacetylene, and porous particles, wherein the mixed-matrix composition further optionally comprises an additional chemical component, and wherein at least one of the a polymer having a fractional free volume of at least 0.1, the porous particle or optional additional chemical component is functionalized with at least one functional group. The first compound binds to the at least one functional group in the mixed-matrix composition, whereby the first compound is catalytically converted to a second compound.

In another embodiment, the at least one functional group is selected from pyridyl, bipyridyl, terpyridyl, anilino, amino, carboxylate, amido, phosphate, sulfate, sulfonic, sulfonamido, hydroxy, sulfhydryl, and cyano. In a preferred embodiment, the second compound is further released from the mixed-matrix composition.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. Although the description herein contains many embodiments, these should not be construed as limiting the scope of the invention but as merely providing illustrations of some of the presently preferred embodiments of the invention.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application. In general the terms and phrases used herein have their art-recognized meaning, which can be found by reference to standard texts, journal references and contexts known to those skilled in the art. Any preceding definitions are provided to clarify their specific use in the context of the invention.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Materials

PTMSP was purchased from Gelest, Inc. (Morrisville, Pa.), and THF was purchased from Mallinckrodt, Inc. (St. Louis, Mo.). Both reagents were both used as received.

Ultra-high purity (99.999%) $CO_2$ and $N_2$ test gases were purchased from AirGas (Salem, N.H.).

Example 1: PTMSP/PAF-1 Composition

PAF-1 was synthesized according to previously reported methods (Konstas et al., 2012, Angew. Chem. Int'l Ed. 51(27):6639-6642; Ben et al., 2009, Angew. Chem. Int'l Ed.

48(50):9457-9460). The particle size was then reduced by cryo-grinding using an agate mortar and pestle in conjunction with liquid nitrogen. The material had a BET surface area of around 5,000 m$^2$/g with pores of 1.3 nm and mesopores of 4 nm.

ZIF-8 nanoparticles were synthesized through an adaptation of a previously reported method (Cravillon et al., 2011, Chem. Mat. 23(8):2130-2141), and were typically of 20 nm particle size.

MMMs were prepared by solvent casting. The different compounds—PTMSP and porous particles (PAF-1 or ZIF-8)—and THF were stirred at room temperature until complete dissolution of PTMSP and formation of a homogeneous solution. The membranes were casted on Teflon plates and dried until complete removal of the solvent. Details of the membranes are illustrated in Table 1.

TABLE 1

| Membrane | wt % of porous particles | Thickness (μm) |
| --- | --- | --- |
| PTMSP | 0 | 75 |
| PTMSP/ZIF-8 | 25 | 60 |
| PTMSP/PAF-1 | 8 | 87 |

Example 2: Gas Permeability Measurements $CO_2$ and $N_2$ permeabilities were measured over an extended period of time with a time-lag apparatus. As illustrated in FIG. 1, $CO_2$ permeabilities were measured for neat PTMSP and mixed-matrix membranes. The initial permeabilities (t=0) were different due to differences in nature of the materials, casting conditions and thickness. For neat PTMSP and mixed-matrix membrane based on ZIF-8, a large decrease of the $CO_2$ permeability was observed. The decrease observed (by nearly 40%) was typical for neat PTMSP membranes and demonstrates the need to stabilize the gas transport properties of the membrane over time. The $CO_2$ permeability (25,000 Barrer) for the PTMSP/PAF-1 membrane was stable over at least 250 days (over 8 months).

Figure 2:
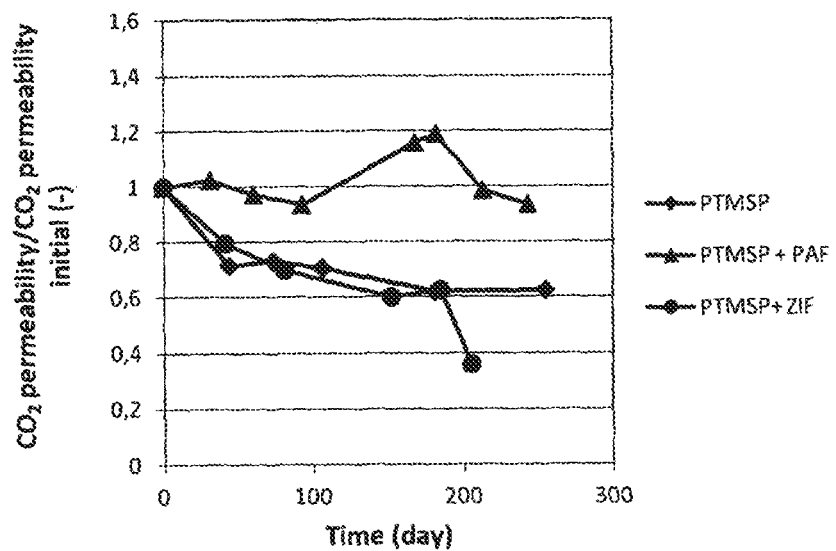
FIG. 2 is a graph illustrating the ratio of [$CO_2$ permeability at time t]/[$CO_2$ permeability at time t=0] as a function of time for the membranes comprising PTMSP, PTMSP+PAF-1, and PTMSP+ZIF-8 described in Example 1.

FIG. 2 illustrates the ratio ($CO_2$ permeability at time t/$CO_2$ permeability at time t=0) over time. The results in FIG. 2 illustrate the distinctions among the three membranes: a significant decrease of the $CO_2$ permeability was observed for the PTMSP and PTMSP/ZIF-8 membranes, whereas the $CO_2$ permeability of the PTMSP/PAF-1 membrane was stable.

Figure 3:
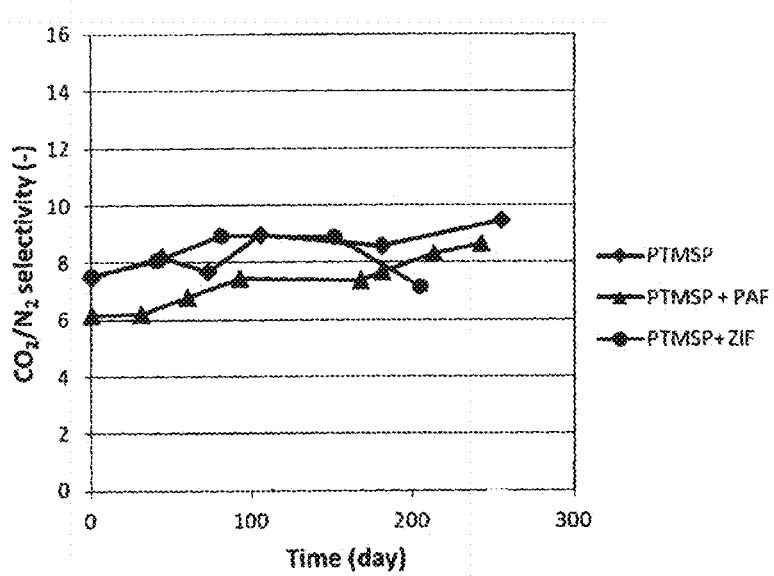
FIG. 3 is a graph illustrating the $CO_2/N_2$ selectivity ratio as a function of time for the membranes comprising PTMSP, PTMSP+PAF-1, and PTMSP+ZIF-8 of Example 1.

FIG. 3 illustrates the evolution with time of $CO_2/N_2$ selectivity of the different membranes. The selectivities were stable over time and comparable among the three membranes.

As demonstrated herein, by loading the PTMSP matrix with porous PAF-1 particles the resulting compositions displayed high and stable permeabilities and selectivities over 250 days, which is a unique result for PTMSP-based membranes. In fact, the $CO_2$ permeability of PTMSP/PAF-1 membrane was higher than the $CO_2$ permeability of neat PTMSP membrane. In contrast, in accordance with literature data, neat PTMSP and PTMSP/ZIF-8 membranes presented a time-dependent decrease in permeabilities due to physical aging.

Example 3: PTMSP/Functionalized PAF-1 Composition

PAF-1 was synthesized according to previously reported methods (Konstas et al., 2012, Angew. Chem. Int'l Ed. 51(27):6639-6642; Ben et al., 2009, Angew. Chem. Int'l Ed. 48(50):9457-9460). PAF-1 was functionalized as shown in Table 2, according to previously reported methods (Lu et al., 2011, J. Am. Chem. Soc. 133(45):18126-18129; Lu et al., 2012, Angew. Chem. Int'l Ed. 51(30):7480-7484).

The functionalized material had a BET surface area of around 1,000 m$^2$/g (native material 2,300 m$^2$/g) with micropores of 1.1 nm (native material 1.3-1.4 nm) and mesopores of 2.7 nm. The changes in pore size and surface area are consistent with filling of micropores with functional groups and align well with previous reports (Zhou et al Adv Mater. 2011, 23, (32), 3723-3725).

MMMs were prepared by solvent casting. The different compounds—PTMSP and functionalized porous particles (PAF-1)—and chloroform were stirred at room temperature until complete dissolution of PTMSP and formation of a homogeneous solution. The membranes were casted on glass petri plates and dried until complete removal of the solvent. Details of the membranes are illustrated in Table 2.

TABLE 2

| Membrane | wt % of porous particles | Thickness (μm) |
| --- | --- | --- |
| PTMSP | 0 | 80 |
| PTMSP/PAF-1 | 10 | 120 |
| PTMSP/PAF-1-$NH_2$ | 10 | 100 |
| PTMSP/PAF-1-$SO_3H$ | 10 | 130 |

Figure 4:
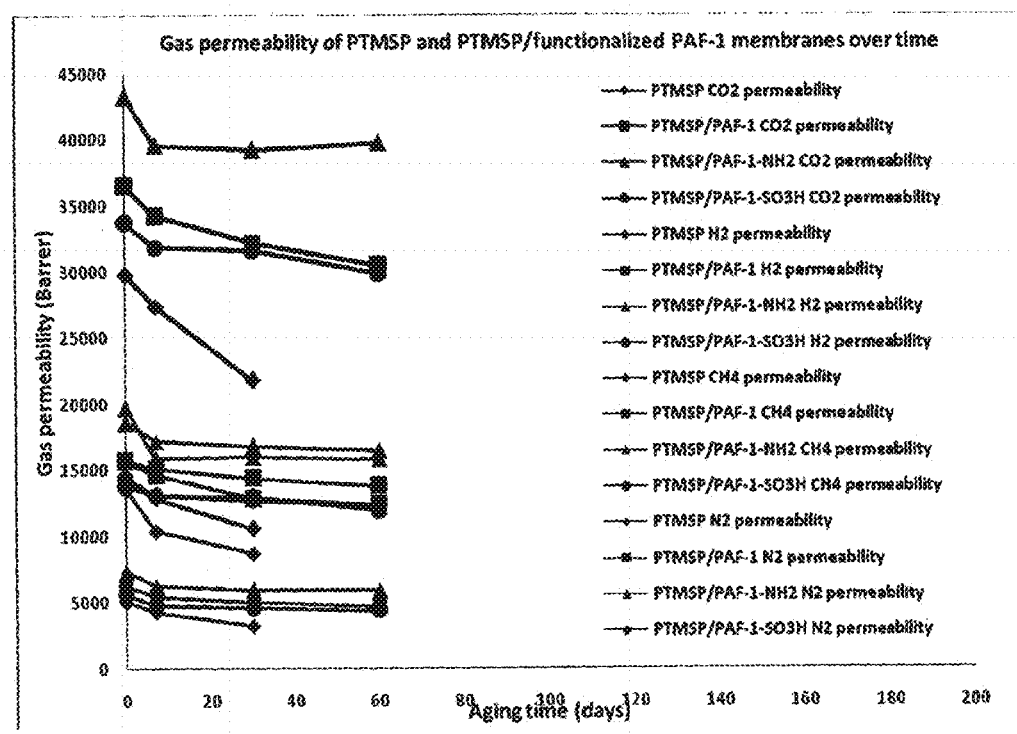
FIG. 4 is a graph illustrating the time-dependent $CO_2$, $H_2$, $CH_4$ and $N_2$ gas permeability of the membranes comprising PTMSP, PTMSP+PAF-1, PTMSP+PAF-1-$NH_2$ and PTMSP+PAF-1-$SO_3H$ described in Example 3.
Figure 5:
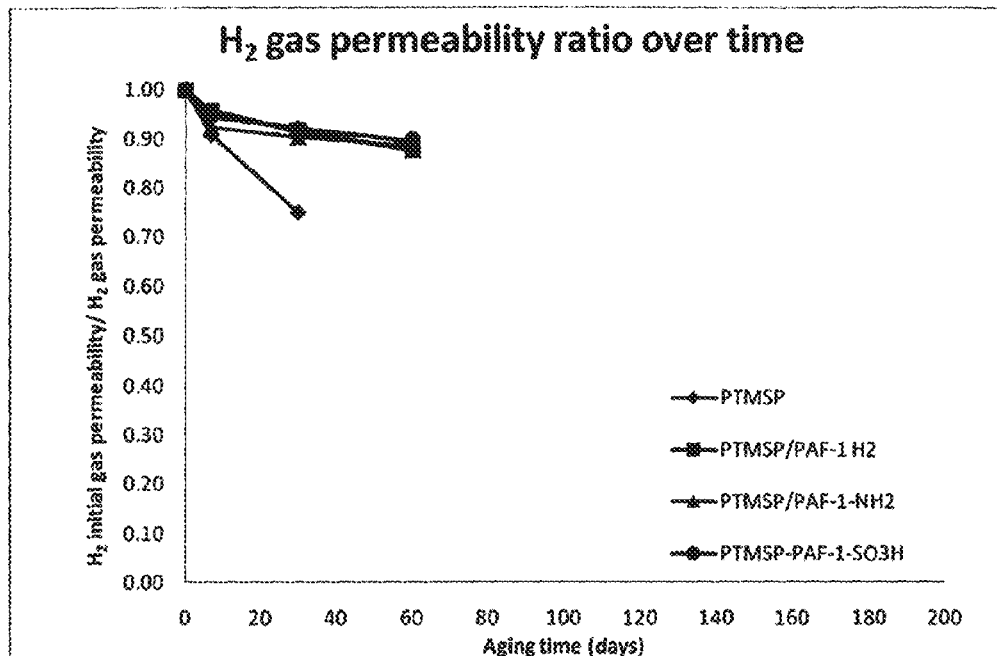
FIG. 5 is a graph illustrating the of [$H_2$ permeability at time t]/[$H_2$ permeability at time t=0] ratio as a function of time for the membranes comprising PTMSP, PTMSP+PAF-1, PTMSP+PAF-1-$NH_2$ and PTMSP+PAF-1-$SO_3H$ described in Example 3.
Figure 6:
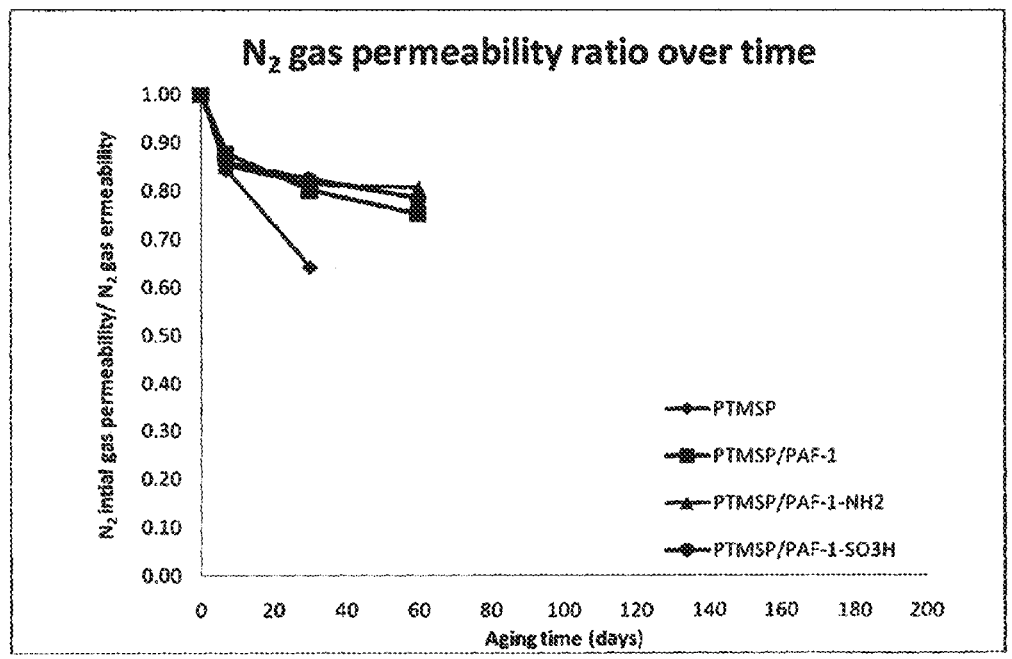
FIG. 6 is a graph illustrating the of [$N_2$ permeability at time t]/[$N_2$ permeability at time t=0] ratio as a function of time for the membranes comprising PTMSP, PTMSP+PAF-1, PTMSP+PAF-1-$NH_2$ and PTMSP+PAF-1-$SO_3H$ described in Example 3.
Figure 7:
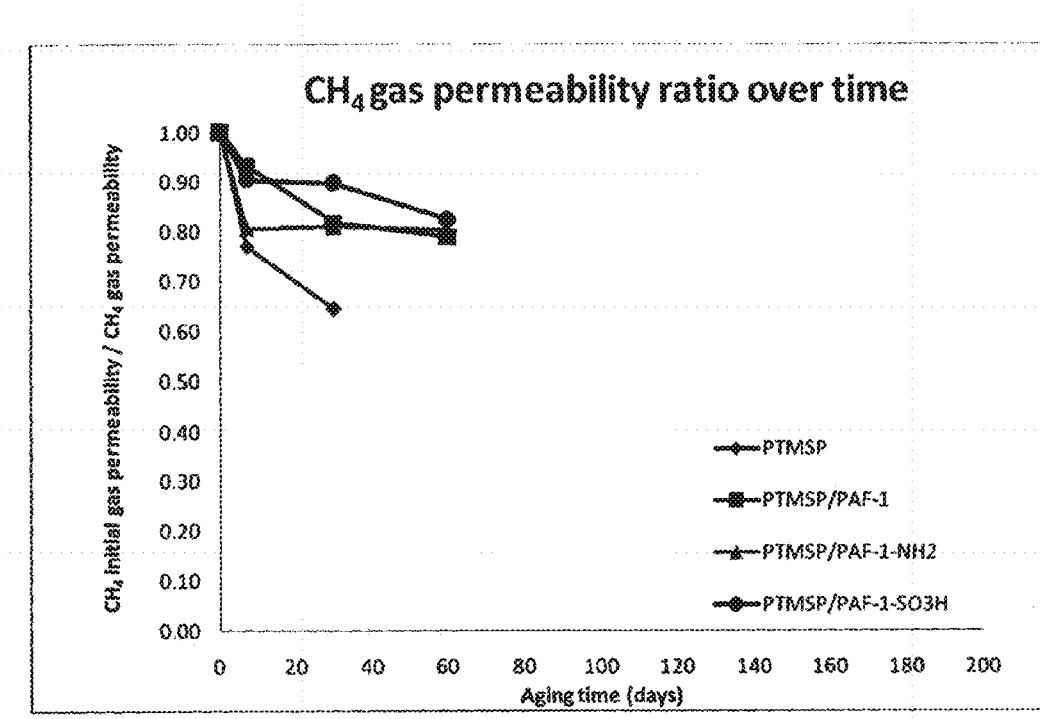
FIG. 7 is a graph illustrating the of [$CH_4$ permeability at time t]/[$CH_4$ permeability at time t=0] ratio as a function of time for the membranes comprising PTMSP, PTMSP+PAF-1, PTMSP+PAF-1-$NH_2$ and PTMSP+PAF-1-$SO_3H$ described in Example 3.
Figure 8:
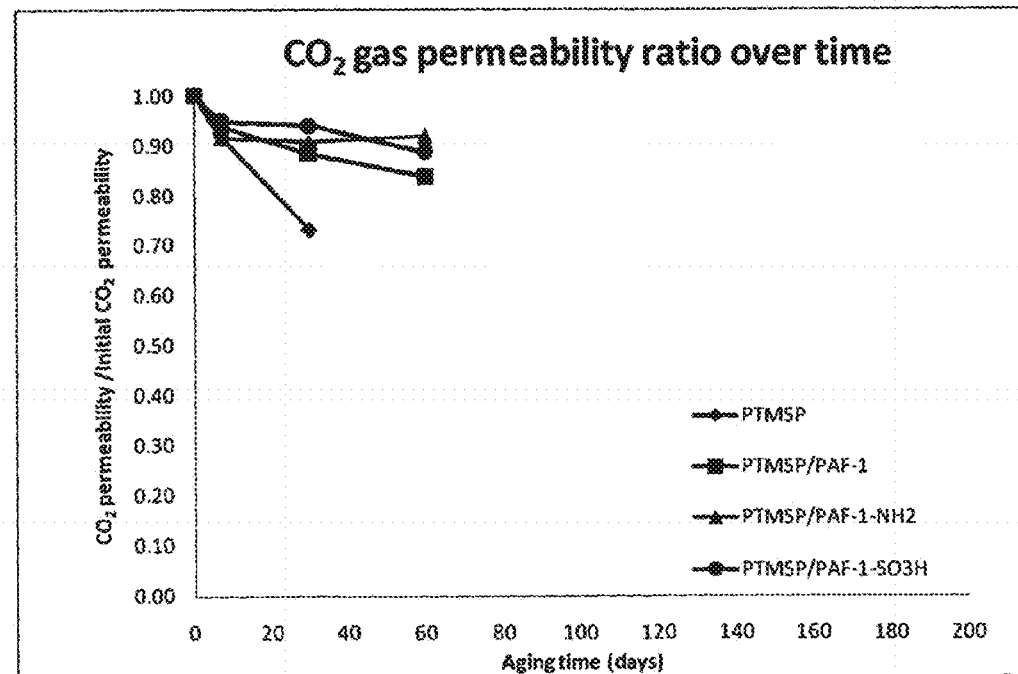
FIG. 8 is a graph illustrating the of [$H_2$ permeability at time t]1[$H_2$ permeability at time t=0] ratio as a function of time for the membranes comprising PTMSP, PTMSP+PAF-1, PTMSP+PAF-1-$NH_2$ and PTMSP+PAF-1-$SO_3H$ described in Example 3.

Example 4: Gas Permeability Measurements $H_2$, $N_2$, $CH_4$ and $CO_2$ permeabilities were measured over an extended period of time with a time-lag apparatus. The initial permeabilities (t=0) were different due to differences in nature of the materials, casting conditions and thickness. As illustrated in FIG. 4, a large decrease in all gas permeabilities was observed in PTMSP over a period of 30 days. The decrease observed (by nearly 30%) was typical for neat PTMSP membranes, and demonstrates the need to stabilize the gas transport properties of the membrane over time. The decrease rate in gas permeabilities of PTMSP/functionalized PAF-1 nanocomposites were stabilized over a period of 30 days.

FIGS. 5, 6, 7, and 8 illustrate the $H_2$, $N_2$, $CH_4$ and $CO_2$ ratios (gas permeability at time t/gas permeability at time t=0), respectively over time. The results in FIGS. 5-8 illustrate the distinctions among the PTMSP membrane and PTMSP/functionalized PAF-1 mixed matrix membranes: a significant decrease of the $H_2$, $N_2$, $CH_4$ and $CO_2$ permeabilities were observed for the PTMSP membrane, whereas the $H_2$, $N_2$, $CH_4$ and $CO_2$ permeabilities of the PTMSP/PAF-1 membrane were stable.

Figure 9:
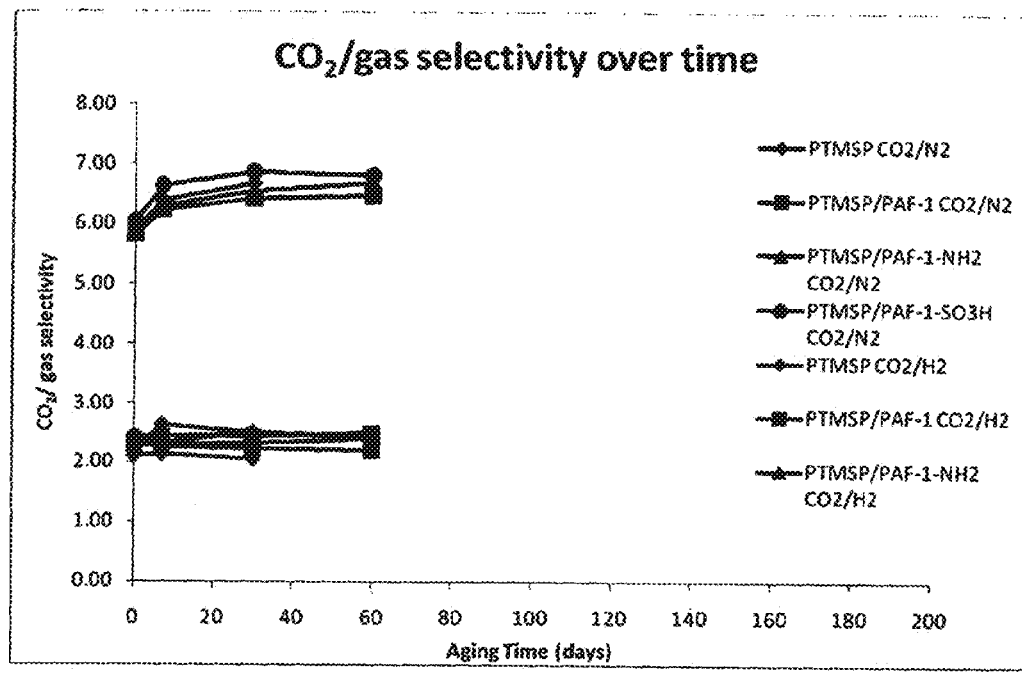
FIG. 9 is a graph illustrating the evolution with time of the $CO_2/H_2$, $CO_2/N_2$, and $CO_2/CH_4$ gas selectivity of the membranes comprising PTMSP, PTMSP+PAF-1, PTMSP+PAF-1-$NH_2$ and PTMSP+PAF-1-$SO_3H$ described in Example 3.

FIG. 9 illustrates the evolution with time of $CO_2/H_2$, $CO_2/N_2$, and $CO_2/CH_4$ selectivities of the different membranes. The selectivities were stable over time and comparable among the PTMSP/functionalized PAF-1 membranes.

Example 5: PTMSP/Nanoparticle-Decorated PAF-1 Composition

PAF-1 was synthesized according to previously reported methods (Konstas et al., 2012, Angew. Chem. Intl Ed. 51(27):6639-6642; Ben et al., 2009, Angew. Chem. Int'l Ed. 48(50):9457-9460) and activated at 200° C. under dynamic vacuum at 10$^{-6}$ Torr for 24 h.

Example 6: PMP/PAF-1 Composition

PAF-1 was synthesized according to previously reported methods (Konstas et al., 2012, Angew. Chem. Int'l Ed. 51(27):6639-6642; Ben et al., 2009, Angew. Chem. Int'l Ed. 48(50):9457-9460). Poly(4-methyl-2-pentyne) (PMP) was synthesized according to previously reported methods (Morisato and Pinnau, 1996, J. Membr. Sci. 121(2):243-250). The material had a BET surface area of around 3,700 m$^2$/g with micropores of 1.1 nm and mesopores of 4 nm.

MMMs were prepared by solvent casting. The different compounds—PTMSP and functionalized porous particles (PAF-1)—and chloroform were stirred at room temperature until complete dissolution of PTMSP and formation of a homogeneous solution. The membranes were casted on glass petri plates and dried until complete removal of the solvent. Details of the membranes are illustrated in Table 3.

TABLE 3

| Membrane | wt % of porous particles | Thickness (μm) |
| --- | --- | --- |
| PMP | 0 | 140 |
| PMP/PAF-1 | 10 | 140 |

Figure 10:
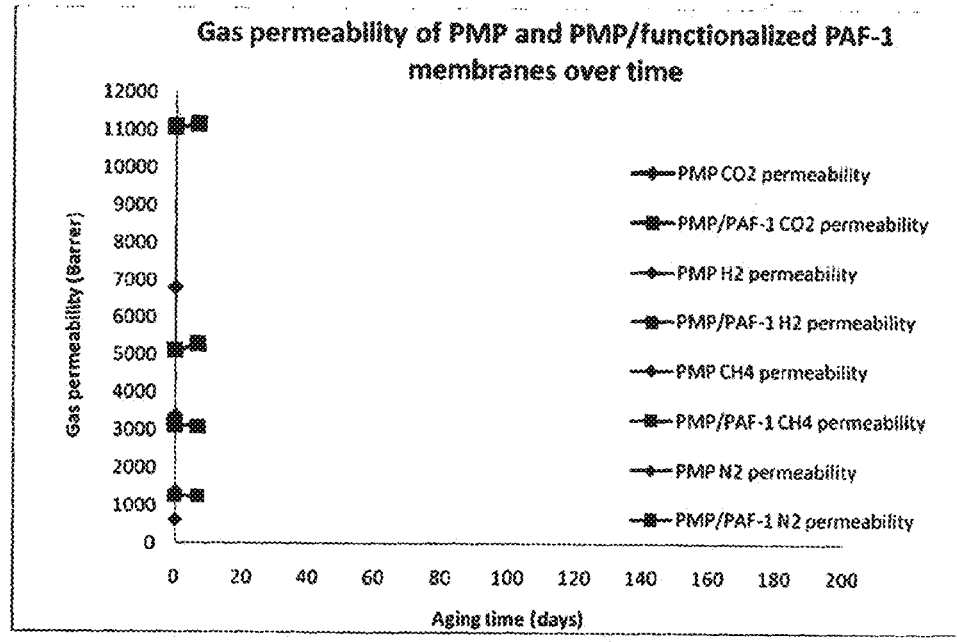
FIG. 10 is a graph illustrating the time-dependent $CO_2$, $H_2$, $CH_4$ and $N_2$ gas permeability of membranes comprising PMP and PMP+PAF-1 described in Example 6.

Example 7: Gas Permeability Measurements $H_2$, $N_2$, $CH_4$ and $CO_2$ permeabilities were measured over an extended period of time with a time-lag apparatus. The initial permeabilities (t=0) were different due to differences in nature of the materials, casting conditions and thickness. As illustrated in FIG. 10, the gas permeabilities of PMP/functionalized PAF-1 membranes were higher than the gas permeabilities of neat PMP membrane, and were stable over a period of 7 days. In contrast, in accordance with literature data, neat PMP membranes presented a time-dependent decrease in permeabilities due to physical aging.

Example 8: PTMSP/Nanoparticle-Decorated PAF-1 Composition

PAF-1 was synthesized as per Example 1. $C_{60}$ nanoparticles were purified by dissolving $C_{60}$ nanoparticles in dry freshly distilled toluene, followed by filtration using a filter cannula stick and the solvent removed under reduced vacuum pressure to give purified $C_{60}$ particles. Lithiated-$C_{60}$ nanoparticles were synthesized according to a previous reported method (Titova et al., 2004, Physics of the Solid state. 46(7):1365-1370).

PAF-1 was subsequently infiltrated with $C_{60}$ or lithiated-$C_{60}$ nanoparticles according to the following method. Under an inert argon atmosphere, a 150 mL Schlenk flask was charged with dry PAF-1 and purified $C_{60}$ nanoparticles or lithiated-$C_{60}$ nanoparticles. The amount of nanoparticles used was between 5-20% of mass weight relative to the amount of PAF-1. The materials were evacuated and backfilled with argon and this cycle was repeated three times. To this, freshly dried and distilled carbon disulfide solvent (30 mL) was added and the reaction mixture mechanically stirred overnight at room temperature.

The solvent was removed by filtration using a filter stick cannula and the remaining material was subsequently washed and filtered with additional dry and distilled carbon disulfide solvent (3×20 mL). The remaining materials were eventually dried under a reduced vacuum pressure (10×10$^{-3}$ torr) to give the corresponding solids.

The native PAF-1 had a BET surface of 3968 m$^2$/g, the low 5% loading of $C_{60}$ decorated PAF-1 had a BET surface area of 3134 m$^2$/g with a pore size of 7.95 Å and the high 20% loading of $C_{60}$ decorated PAF-1 had a BET surface area of 2351 m$^2$/g with a pore size of 7.95 Å. The 10% loading lithiated $C_{60}$ decorated PAF-1 had a BET surface area of 4321 m$^2$/g and the BET surface area of the starting PAF-1 was 3602 m$^2$/g. In another example, the surface area was over 6600 m$^2$/g starting with the same PAF surface area. This material is denoted PAF-1-Li—$C_{60}$ (b). Surface area details of the infiltrated PAFs are presented in Table 4.

Although this example describes lithiated-$C_{60}$ particles, same metal functionalisation procedure of fullerenes or fullerides can be performed with other metals, including magnesium, aluminium, sodium, potassium, cesium, calcium, strontium and any one of the transition metals.

TABLE 4

| Materials | BET Surface (m$^2$/g) | wt % loading |
| --- | --- | --- |
| PAF-1 | 3968 | — |
| PAF-1-$C_{60}$ | 3184 | 5 |
| PAF-1-$C_{60}$ | 2351 | 10 |
| PAF-1 | 3601 | — |
| PAF-1-Li—$C_{60}$ (a) | 4321 | 10 |
| PAF-1-Li—$C_{60}$ (b) | 6600 | 10 |

MMMs with PTMSP were subsequently prepared by solvent casting as previously described. Details of the resulting membranes are illustrated in Table 5.

TABLE 5

| Membrane | wt % of porous particles | Thickness (μm) |
| --- | --- | --- |
| PTMSP | 0 | 80 |
| PTMSP/PAF-1 | 10 | 120 |
| PTMSP/PAF-1-$C_{60}$ | 10 | 100 |
| PTMSP/PAF-1-Li—$C_{60}$ (a) | 10 | 120 |

Figure 11:
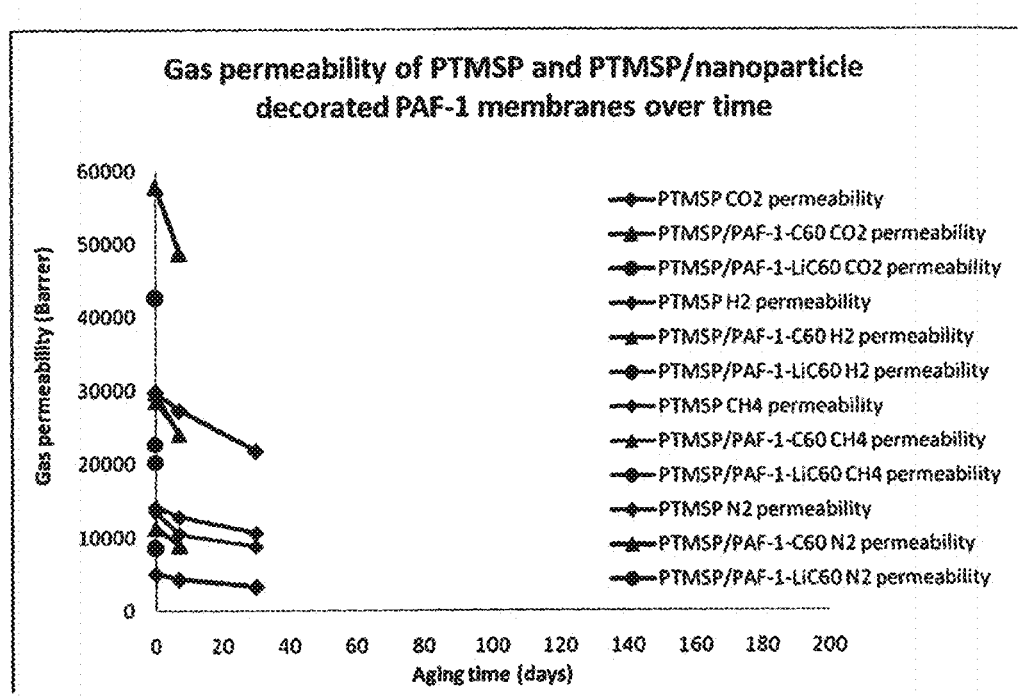
FIG. 11 is a graph illustrating the time-dependent $CO_2$, $H_2$, $CH_4$ and $N_2$ gas permeability of membranes comprising PTMSP and PTMSP+decorated PAF-1 described in Example 8.

Example 9: Gas Permeability Measurements $H_2$, $N_2$, $CH_4$ and $CO_2$ permeabilities were measured over 7 days with a time-lag apparatus. The initial permeabilities (t=0) were different due to differences in nature of the materials, casting conditions and thickness. As illustrated in FIG. 11, a large increase in all gas permeabilities (when compared to pristine (control) PTMSP membranes) were observed in PTMSP/PAF-1-$C_{60}$ and PTMSP/PAF-1-Li—$C_{60}$ mixed matrix membranes as a result of the increased combined porosity afforded with this mixed matrix composition.

Example 10: PIM/PAF-1 Composition

PIM-1 was synthesized using a high temperature approach. 5,5'6,6'-tetrahydroxy-3,3,3',3'-tetramethylspirobisindane (TTSBI), $K_2CO_3$, DMAc were all purified before use. 1 g TTSBI, 1.702 g TFB, and 1.797 g of $K_2CO_3$ were placed in a 100 mL round bottom flask and dried under vacuum at 100° C. and flushed with argon for at least 3 times. 20 mL of dehydrated DMAc and 10 mL of dehydrated toluene was discharged into the round bottom flask containing the pre-dried monomers. The mixture was stirred at 160° C. for 1 hour. The yellow solution was allowed to stir under argon flow for the next 40 minutes. This yellow viscous solution was then poured into a methanol solution at room temperature to form fluorescent yellow polymer threads. This solution was subsequently filtered and the precipitate dried. The yellow polymer threads were then re-dissolved in chloroform and re-precipitated in methanol. The final yellow product was refluxed in deionized water for 24 hours to remove remainder $K_2CO_3$ salt.

Fabrication of PIM-1/PAF-1 Membrane

Dry PAF-1 powder was mixed with the previously synthesized PIM-1 according to a 10 wt. % PAF-1 content with respect to the weight of PIM-1 9.67 g of chloroform was added to the mixture. The solution was stirred for 24 hr at ambient conditions. About 30 μm thick membrane were formed via solution casting at ambient conditions. The membranes were dried in a vacuum oven at 40° C. for 24 h prior to single gas permeability measurements. The densities of the membranes were measured using a helium pycnometer.

Similar gas permeation studies were performed with these membranes, as in Examples 1-9. Membranes approaching 100 μm thickness were employed in this instance, to provide reliable data over the long measurement period.

Figure 12:
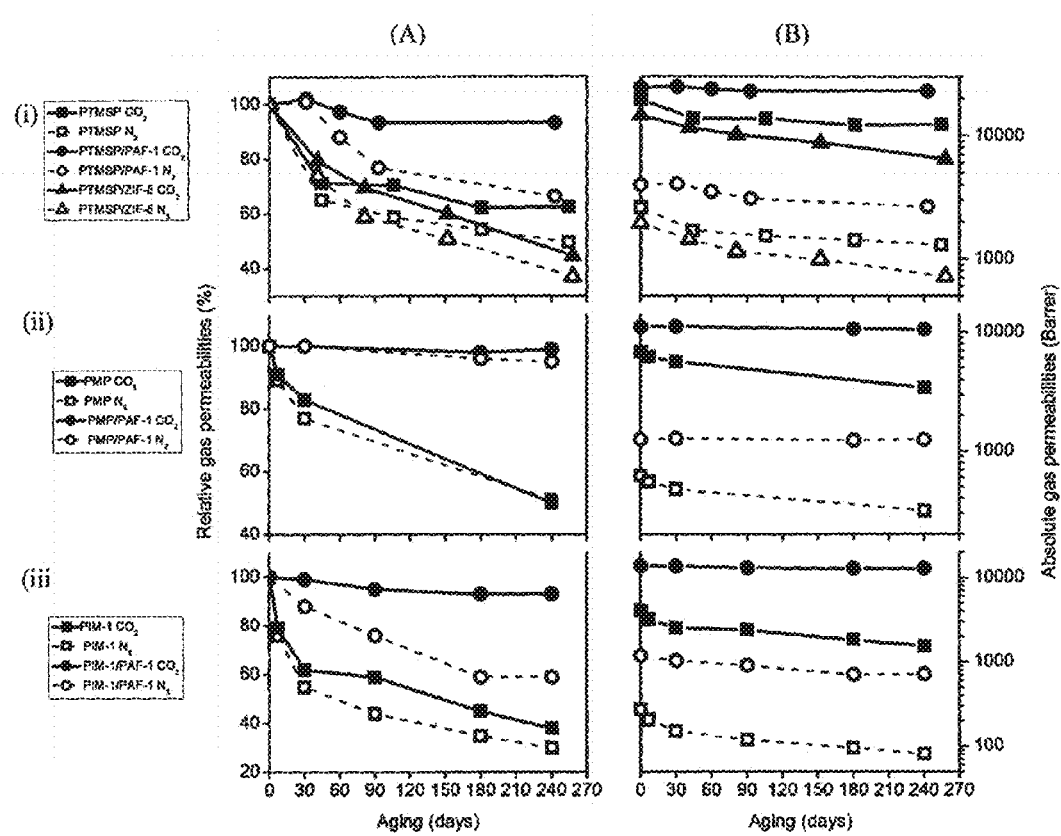
FIG. 12 is a compilation of the graphs obtained from various experimental data comparing the gas permeability of membranes based on native PTMSP, PMP and PIM-1 with membranes made of the same polymers and functionalised with PAF-1 or ZIP-8. The plots show the permeation of $CO_2$ and $N_2$ varies with time, up to 240 days. The empty symbols represent pristine polymer membranes, while the solid symbols represent nanocomposite membranes. Squares, circles, and triangles represent pristine polymers, polymers with PAF-1, and polymers with metal organic frameworks, respectively. (A) plots refer to relative gas permeabilities and (B) plots refer to absolute gas permeabilities.

The data shown in FIG. 12 allows one to compare the time-dependent gas separation performance of various control, pristine MMM and MMM composite membranes according to this invention, as described in the Examples. It can be seen that the addition of PAF-1 to the polymers decelerates aging. No significant decrease (less than 7%) in $CO_2$ permeability was observed over a 240 days period of time. In some membranes no relative change to the permeability was observed over the same time. Additionally, $N_2$ permeability was observed to decrease in some samples, thus improving their selectivity for $CO_2/N_2$ over time.

MOF (ZIF-8) particles were included as a further test material. ZIF-8 has a uni-modal pore size distribution that is smaller (around 1 nm) than the tri-modal pore size distributions of PAF-1 (0.3 nm, 1.2 nm, and 4.8 nm), which allows to perform size-sieving of light gases.

NMR probing indicates that the polymer side chains in PTMSP and bulky chemical moieties in PIM-1 are found to be intercalated within the PAF-1 pores, freezing the open porous structure in place. NMR probing has also revealed that pendant methyl groups, and most crucially the trimethylsilyl groups of the polymer appear to be essentially unchanged with aging. The pendant trimethylsilyl groups are the dominant feature responsible for interchain interaction and chain packing, a key driver of free volume and hence permeability. The overall mechanism that can be postulated by NMR data is that the PTMSP is tethered by the inclusion of pendant methyl groups within the pore architecture of PAF-1. This increases the freedom of the main chain segments, leaving the trimethylsilyl groups unchanged, which is key to propping main chains open and delivering free volume (shown schematically, FIG. 14). Further experimental probing by positron annihilation lifetime spectroscopy (PALS) was also carried out. PALS spectra gives information on the size and number of pores within the composite material. In the data here the probing has shown that the pores of pristine (control) PTMSP of ca. 1.2 nm diameter shrink and lessen in concentration with aging, accounting for the lowered gas permeability, see FIG. 13. Other pore sizes are largely unchanged. In PTMSP/PAF-1 membranes, these 1.2 nm pores of the composites are slightly reduced in size, thus contributing to the extremely slow aging effect observed.

PMP/PAF-1 membranes confirm these trends. The NMR spectra reveal unchanged values for side chain carbons, while carbons in the main chain are reduced with aging time. Additional data show that the pores of the composite start off at ca. 1.1 nm and are enlarged in the presence of PAF-1 and are maintained over 240 days, while pores of the composite of ca. 1.5 nm diameter remain largely unchanged, explaining the remarkable anti-aging effect observed in PMP/PAF-1. The 1.1 and 1.5 nm pores are ideal sizes for surface and Knudsen diffusion of $CO_2$ and $N_2$ molecules, respectively.

The mechanism varies slightly for PIM-1/PAF-1 membranes. For the PIMs the data the shows that aging characteristics varies slightly for PIM-1/PAF-1 membranes. The addition of PAF-1 does not inhibit pore shrinkage and this result is commensurate with the loss in $N_2$ permeability over time. The pores of the composite shrink to ca. 0.6 nm, which is favorable for $CO_2$ sorption. For PIM-1/PAF-1 composites, the largest pore size distribution observed is wide enough to facilitate $CO_2$ and $N_2$ activated diffusion only. PAF-1 improves $CO_2$ sorption in PIM-1 and the composites maintain the improved sorption over time.

Tetrahedral carbon atoms are crucial points of contortion for the bending and flexing of rigid components with internal flexibility in PIM-1 and are sensitive to the molecular mobility of the carbon atoms in the bulky chemical moieties. As PIM-1 ages, tetrahedral carbon atoms become more mobile. The incorporation of PAF-1 into PIM-1 rigidified tetrahedral carbon atoms and consequently freezes the tetrahedral carbon atoms at, one of the points of contortion, hence inhibiting PIM-1 flexing. Meanwhile, other carbon atoms become more flexible in the presence of PAF-1 indicating that the tetrafluoro-based component remains flexible.

Figure 13:
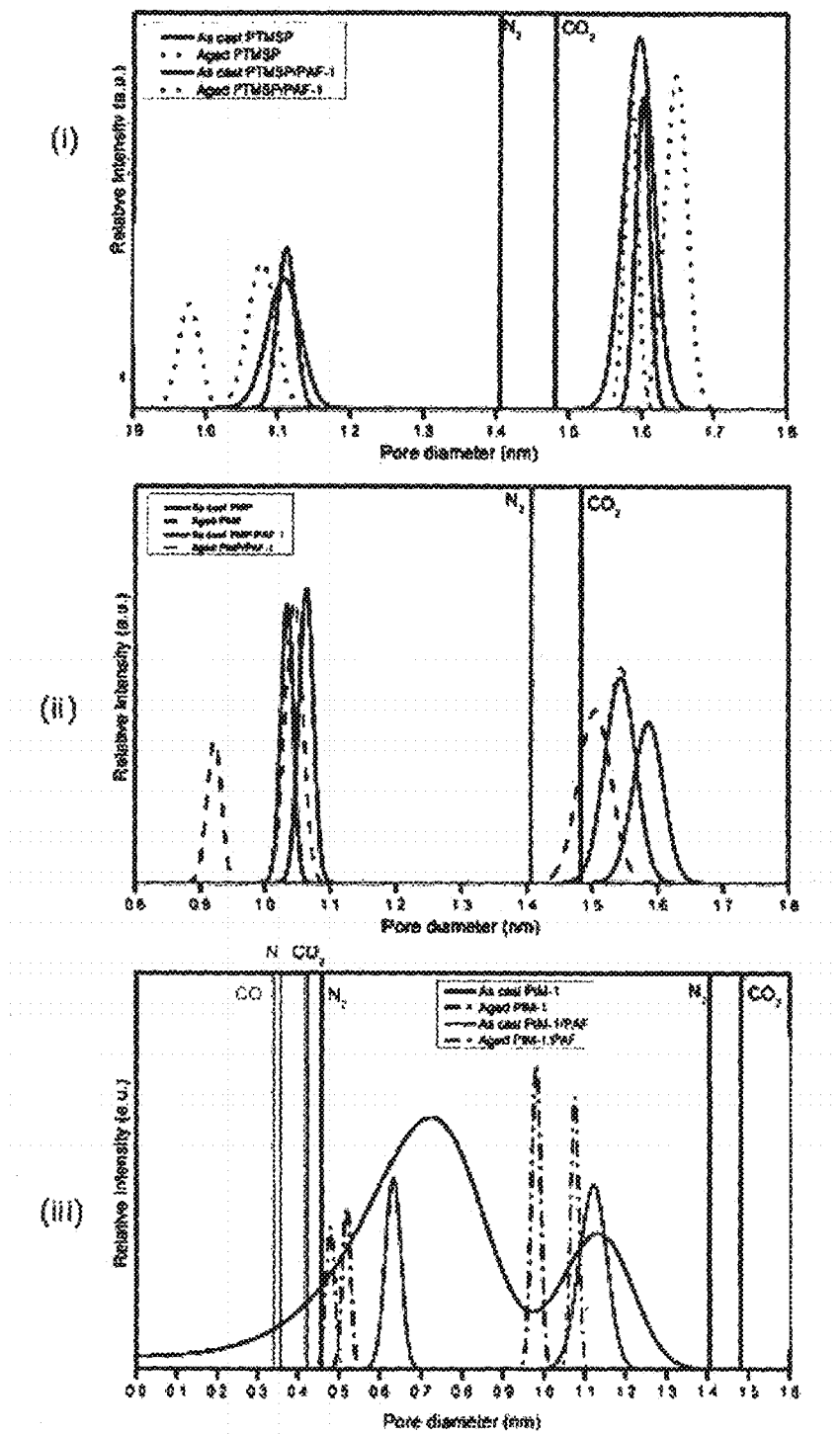
FIG. 13 is a series of graphs showing the variation in apparent pore sizes of various MMM according to embodiments of the invention, measured before and after 240 days aging.
Figure 14:
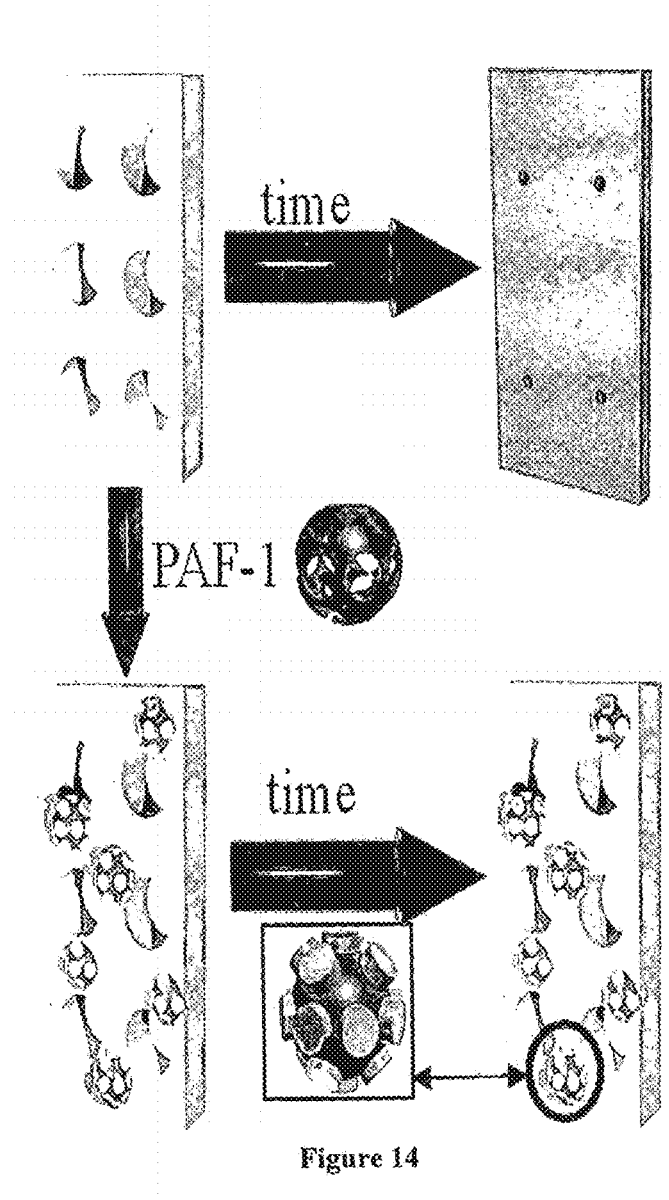
FIG. 14 is a schematic representation of polymer/PAF-1 intermixing. Typically, native PTMSP, PMP and PIM-1 densify over time (age) to conformations that are non-permeable to gases. The representation schematically show that the addition of PAF-1 allows preserving the original permeable structure (bottom).

FIG. 12 further illustrates that for PIM-1 and PIM-1/PAF-1 membranes the permeability changes over time. FIG. 13 provides an explanation, showing that the smaller pore size for aged PIM-1/PAF-1 (0.47 nm) is smaller than for aged PIM-1 (0.52 nm), hence the higher selectivity. The 0.47 nm pore size of aged PIM-1/PAF-1 is also closer to the optimal pore size of 0.42 nm for $CO_2$ solubility according to the gas-pore potential energy field, hence the higher permeability. In addition, the large pore size (1.2 nm) for PIM-1/PAF-1 does not shift very much during aging, hence maintaining a high flux. Therefore the maintenance of enhanced $CO_2$ permeability in PIM-1 is attributable not only to the 1.2 nm pore offering fast flux pathways, but also the enhanced $CO_2$ solubility coefficients within the optimal 0.47 nm pore.

Table 6 reports permeability and selectivity values derived from some of the Examples. In particular, the Table allows to compare gas permeability and selectivity of native PTMSP, PMP and PIM-1 membranes with the corresponding values of gas permeability and selectivity of composite PTMSP/PAF, PTMSP/PAF-NH$_2$, PTMSP/PAF-Li—C$_{60}$, PTMSP/PAF-C$_{60}$ PMP/PAF-1, PIM-1/PAF-1. The values refer to permeability of $H_2$, $N_2$, $CH_4$ and $CO_2$, and to $CO_2/H_2$, $CO_2/N_2$, $CO_2/CH_4$ selectivity.

The values show that permeability of all gases increases with the addition of porous particles to the polymers. In the case of polymers containing functionalised porous particles, the permeability increases even further. The use of porous particles containing fullerenes gave particularly high rates of permeability.

The effect of adding porous particles to the polymer was particularly marked in the case of PIM polymers, in which nearly a three fold increase in the permeability of all the tested gases was observed over the permeability of the same gases measured using the PIM polymers alone.

The data also shows that the selectivity for various gas mixtures can be manipulated depending on the gases and the choice of mixed-matrix composition. For example, to separate $CH_4$ from $CO_2$, use of a PIM-PAF-1 MMM would be of benefit over the PIM polymer alone.

TABLE 6

| Polymer | Additive | $H_2$ permeabilities (Barr) | $CO_2/H_2$ selectivity | $N_2$ permeabilities (Barr) | $CO_2/N_2$ selectivity | $CH_4$ permeabilities (Barr) | $CO_2/CH_4$ selectivity | $CO_2$ permeabilities (Barr) |
|---|---|---|---|---|---|---|---|---|
| PTMSP | control | 14166 | 2.10 | 5083 | 5.86 | 13495 | 2.21 | 29796 |
| PTMSP-PAF | With porous particle | 15749 | 2.31 | 6260 | 5.82 | 15634 | 2.33 | 36406 |
| PTMSP-PAF-$NH_2$ | With porous particle functionalised | 17437 | 2.34 | 7436 | 5.48 | 19881 | 2.05 | 40786 |
| PTMSP-PAF-Li-$C_{60}$ (L) | With porous particle functionalised | 20305 | 2.09 | 8495 | 5.01 | 22565 | 1.88 | 42531 |
| PTMSP-PAF-$C_{60}$ | With porous particle functionalised | 28603 | 2.02 | 11362 | 5.08 | 29774 | 1.94 | 57765 |
| PMP | control | 3397 | 2.01 | 622 | 10.96 | 1402 | 4.86 | 6819 |
| PMP-PAF-1 | With porous particle | 5123 | 2.16 | 1261 | 8.76 | 3126 | 3.53 | 11047 |
| PIM-1 | control | 1681 | 2.42 | 275 | 14.8 | 496 | 8.21 | 4071 |
| PIM-PAF-1 | With porous particle | 5530 | 2.50 | 1191 | 11.62 | 2232 | 6.20 | 13835 |

While the invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A mixed-matrix composition comprising (i) polymer having a fractional free volume of at least 0.1 and (ii) porous aromatic framework (PAF) particles, wherein the polymer is selected from the group consisting of polymers of intrinsic microporosity (PIMs), thermally rearranged (TR) polymers, hyperbranched polymers, substituted polyacetylenes, and combinations thereof.

2. The composition of claim 1, wherein the polymer is a substituted polyacetylene selected from the group consisting of poly (1-(trimethylsilyl)-1-propyne) (PTMSP), poly (1-(dimethyl-n-propylsilyl)-1-propyne), poly (1-(dimethyl-n-butylsilyl)-1-propyne), poly (1-phenyl-1-propyne)poly (diphenylacetylene), poly (t-butylacetylene), poly (1-phenyl-2-p-trimethylsilylphenyl-acetylene), poly (1-phenyl-2-p-hydroxyphenyl-acetylene), copolymers thereof, and combinations thereof.

3. The composition of claim 1, wherein the porous aromatic framework (PAF) particles are selected from the group consisting of PAF-1 (PAF-302), PAF-3, PAF-4, PAF-11 (PAF-304), PAF-301, PAF-303, JUC-Z1, JUC-Z2, PPN-4, PPN-5, PPN-6-$SO_3H$, PPN-6-$SO_3Li$, a salt thereof, and any mixtures thereof.

4. The composition of claim 1, wherein the polymer and/or the porous aromatic framework (PAF) particles comprise one or more functional groups selected from the group consisting of —NHR, —N(R)$_2$, —NH$_2$, —NO$_2$, —NH (aryl), halides, aryl, aralkyl, alkenyl, alkynyl, pyridyl, bipyridyl, terpyridyl, anilino, —O(alkyl), cycloalkyl, cycloalkenyl, cycloalkynyl, sulfonamido, hydroxyl, cyano, —(CO)R, —(SO$_2$)R, —(CO$_2$)R, —SH, —S(alkyl), —SO$_3$H, —SO$^{3-}$M$^+$, —COOH, COO$^-$M$^+$, —PO$_3$H$_2$, —PO$_3$H$^-$M$^+$, —PO$_3{}^{2-}$M$^{2+}$, —CO$_2$H, silyl derivatives, borane derivatives, ferrocenes and other metallocenes, where M is a metal atom, and R is $C_{1-10}$ alkyl.

5. The composition of claim 1, wherein the composition is in the form of a mixed-matrix membrane.

6. The composition of claim 1, wherein the composition is in the form of a layer embedded within at least a portion of a porous support or in the form of a layer deposited on at least a portion of a surface of a porous support.

7. A method of performing separation of a component in a fluid mixture, the method comprising the steps of:
providing the fluid mixture comprising the component;
contacting the fluid mixture with one surface of a mixed-matrix membrane comprising (i) polymer having a fractional free volume of at least 0.1 and being selected from the group consisting of polymers of intrinsic microporosity (PIMs), thermally rearranged (TR) polymers, hyperbranched polymers, substituted polyacetylenes, and combinations thereof, and (ii) porous aromatic framework (PAF) particles;
applying a driving force across the mixed-matrix membrane; and
isolating a filtered composition from another surface of the mixed-matrix membrane,
wherein the ratio of the component in the filtered composition is different from the ratio of the component in the fluid mixture, whereby separation of the component from the fluid mixture is performed.

8. The method of claim 7, wherein the polymer is a substituted polyacetylene selected from the group consisting of poly (1-(trimethylsilyl)-1-propyne) (PTMSP), poly (1-(dimethyl-n-propylsilyl)-1-propyne), poly (1-(dimethyl-n-butylsilyl)-1-propyne), poly (1-phenyl-1-propyne)poly (diphenylacetylene), poly (t-butylacetylene), poly (1-phenyl-2-p-trimethylsilylphenyl-acetylene), poly (1-phenyl-2-p-hydroxyphenyl-acetylene), co-polymers thereof, and any mixtures thereof.

9. The method of claim 7, wherein the porous aromatic framework (PAF) particles are selected from the group consisting of PAF-1 (PAF-302), PAF-3, PAF-4, PAF-11 (PAF-304), PAF-301, PAF-303, JUC-Z1, JUC-Z2, PPN-4, PPN-5, PPN-6-$SO_3H$, a salt thereof, and any mixtures thereof.

10. The method of claim 7, wherein combined porosity characteristics of the polymer and the porous aromatic framework (PAF) particles are selected such that the fractional free volume of the polymer does not decrease by more than about 10% over a period of time of up to 250 days.

11. The method of claim 7, wherein the fluid mixture is a gas mixture, the component is a gas component, and the separation of the gas component from the gas mixture results from a difference in gas selectivity and gas permeability of the mixed-matrix membrane towards the gas component relative to another component of the gas mixture.

12. The method of claim 11, wherein the gas permeability of the mixed-matrix membrane towards the gas component remains within 20% of its initial value over a period of at least 100 days.

13. The method of claim 11, wherein the gas selectivity of the mixed-matrix membrane towards the gas component remains within about 33% of its initial value over a period of at least 100 days.

14. A method of forming a mixed-matrix membrane having reduced aging characteristics, comprising:
combining a polymer and porous aromatic framework (PAF) particles to form a mixed-matrix membrane in which the polymer has a fractional free volume of at least 0.1, wherein the polymer is selected from the group consisting of polymers of intrinsic microporosity (PIMs), thermally rearranged (TR) polymers, hyperbranched polymers, substituted polyacetylenes, and combinations thereof.

15. The method of claim 14, wherein the mixed-matrix membrane has increased permeability to gases relative to the polymer absent the particles.

* * * * *